US007997977B2

(12) United States Patent
Yoshizawa

(10) Patent No.: US 7,997,977 B2
(45) Date of Patent: Aug. 16, 2011

(54) CARD GAMING MACHINE AND CARD GAME PLAYING METHOD

(75) Inventor: Kazumasa Yoshizawa, Tokyo (JP)

(73) Assignee: Universal Entertainment Corporation, Tokyo (JP)

(*) Notice: Subject to any disclaimer, the term of this patent is extended or adjusted under 35 U.S.C. 154(b) by 799 days.

(21) Appl. No.: 12/045,913

(22) Filed: Mar. 11, 2008

(65) Prior Publication Data

US 2009/0042639 A1 Feb. 12, 2009

(30) Foreign Application Priority Data

Mar. 13, 2007 (JP) ................................ 2007-064053

(51) Int. Cl.
*G06F 17/00* (2006.01)

(52) U.S. Cl. ........................................................ 463/22

(58) Field of Classification Search .............. 463/11–13, 463/16–25; 273/309
See application file for complete search history.

(56) References Cited

U.S. PATENT DOCUMENTS

| | | | | |
|---|---|---|---|---|
| 6,264,560 | B1 * | 7/2001 | Goldberg et al. | 463/42 |
| 6,773,012 | B1 * | 8/2004 | French | 273/292 |
| 6,793,220 | B1 | 9/2004 | Feola | |
| 6,796,898 | B1 | 9/2004 | Timpano | |
| 6,808,173 | B2 | 10/2004 | Snow | |
| 7,185,891 | B2 * | 3/2007 | Jackson | 273/292 |
| 7,789,743 | B2 * | 9/2010 | Walker et al. | 463/16 |
| 2004/0023712 | A1 | 2/2004 | Oliver | |
| 2004/0248636 | A1 | 12/2004 | Webb | |
| 2006/0066050 | A1 | 3/2006 | Sorge | |

OTHER PUBLICATIONS

Macao Official Action, Oct. 13, 2009.

* cited by examiner

*Primary Examiner* — Ronald Laneau
(74) *Attorney, Agent, or Firm* — NDQ&M Watchstone LLP

(57) ABSTRACT

A card gaming machine determines a dealer's hand and a player's hand for each terminal and specifies a remaining card group. The player's hand and the dealer's hand are compared for winning/losing judgment, and a prize based on the judgment result is awarded. If a side bet is made, a bonus judgment process is carried out for a bonus target card group consisting of a first card group selected and determined from a remaining card group and a second card group selected and determined from the player's hand irrespective winning/losing judgment result, and a bonus payout based on the judgment result is awarded.

8 Claims, 15 Drawing Sheets

FIG. 13

| POKER COMBINATION | CREDITS FOR PRIZE |
|---|---|
| ROYAL STRAIGHT FLUSH | JACKPOT |
| STRAIGHT FLUSH | 500 |
| FOUR OF A KIND | 250 |
| FULL HOUSE | 100 |
| FLUSH | 75 |
| STRAIGHT | 50 |
| THREE OF A KIND | 25 |
| TWO PAIRS | 15 |
| ONE PAIR | 10 |

CARD GAMING MACHINE AND CARD GAME PLAYING METHOD

CROSS-REFERENCE TO RELATED APPLICATIONS

This application is based upon and claims a priority from the prior Japanese Patent Application No. 2007-064053 filed on Mar. 13, 2007, the entire contents of which are incorporated herein by reference.

BACKGROUND

1. Field

The present invention relates to a card gaming machine and a card game playing method, in which winning or losing is judged by comparing player's hand and dealer's hand composed of a predetermined number of cards and a prize is awarded depending on the winning/losing judgment result. In particular, the present invention relates to a card gaming machine and a card game playing method capable of awarding a different prize independent of the winning/losing result in the case where a side bet of a gaming value is made.

2. Description of the Related Art

Conventionally, casinos or game arcades provide card game machines or tables for card games. Card games such as Pai Gow Poker, Draw Poker or Blackjack are well known forms of card games played by using those card game machines or tables. For these card games, cards each of which has a number and a suit (e.g., Ace of Hearts) are used. And a value of a prize to be awarded to a player is determined based on a hand of cards dealt to each player (hereinafter referred to as "player's hand") and a hand of cards dealt to a dealer (hereinafter referred to as "dealer's hand").

As one of examples of inventions related to such card game machines or tables, there is one invention disclosed in U.S. Pat. No. 6,793,220. In Pai Gow Poker, seven cards are dealt to a dealer and a player (one through six players), respectively. Then the dealer and each player divide the seven cards into two hands: a five-card hand (high hand) and a two-card hand (low hand). Finally, the numbers and suits in sets of the players' and those of the dealer's hands are compared to determine winning/losing and/or values of awards.

In conventional card gaming machines and card game playing methods, when a player wins the dealer, a payout is determined unambiguously according to the hand of cards the player holds (e.g., straight flush, full house, etc).

Therefore, once cards have been dealt out and at a player's own hand, the player can predict, to a certain degree, possible prizes in a game. That is, if a hand of cards a player holds is not good, the player's expectation in high prize will be very slim. In this case, the player might lose interest in the game as well.

According to the card gaming machine and a card game playing method disclosed in U.S. Pat. No. 6,793,220, in case a predetermined side bet has been made, the card game is played using player's hands on standard Pai Gow Poker. In detail, when a predetermined number of cards, the number of which to be dealt depends on a manner of a side bet, are dealt out, presence of a winning combination with the predetermined number of cards for the side bet is judged. And a player gets an extra prize (i.e. bonus) for the winning combination on the side bet, irrespective of winning/losing in the Pai Gow Poker. For example, in case a side bet is made for a three-card low hand, presence of winning combination of the three-card low hand is judged when cards for the three-card low hand are dealt out to all of the players. According to the conventional card game playing method, a prize depending on kind of put hand (e.g., same suit flush) is awarded to a winning player irrespective of winning/losing in Pai Gow poker.

However, the card gaming machine and the card game playing method disclosed in U.S. Pat. No. 6,793,220 is not free from the conventional card game problem discussed earlier. That is, players can predict, to a certain degree, their possible prizes in a game as soon as cards are dealt out. And if a player does not hold a good hand, the player's expectation in high prize will be very slim, which induces decrease of interest in the game.

The same is also observed even in a card game with a side bet option described in U.S. Pat. No. 6,793,220. Namely, players can predict their possible prizes in a game as soon as cards, the number of which is predetermined depending on side bet condition, are dealt out. To be short, also in a card game with a side bet option, if a player does not hold a good hand, the player's expectation in high prize will be very slim, which induces decrease of interest in the game.

To address the above-discussed problems in the related art, it is, therefore, an object of the present invention to provide a card gaming machine and a card game playing method, in which winning or losing is judged by comparing player's hand and dealer's hand composed of a predetermined number of cards and a prize is awarded depending on the winning/losing result, on condition that a betting of a gaming value is made. In particular, the present invention relates to a card gaming machine and a card game playing method capable of raising players' expectation in prizes and interest in the card game by providing different prizes independent of the results of the winning/losing judgment in the case where a side bet of a gaming value is made.

SUMMARY

According to one or more aspects of the present invention there is provided a card gaming machine comprising: a display for showing a plurality of cards from among a set of a predetermined number of cards that compose a deck; an operating unit for receiving an input of information from a player; and a game controller executing the steps of: (a) receiving a betting of a gaming value made by the player; (b) making winning/losing judgment by comparing a player's hand consisting of cards associated with the player with a dealer's hand consisting of cards associated with the dealer, among a plurality of cards displayed on the display; (c) awarding to the player a first prize that is based on a betted gaming value and a result of the winning/losing judgment; (d) receiving a side bet of a gaming value made by the player; (e) in a case where the side bet is made, specifying a remaining card group that consists of remaining cards with the player' hand and the dealer's hand being excluded; (f) determining a first card group consisting of a first predetermined number of cards from among the remaining card group; (g) determining a bonus target card group constituted by combining the first card group and a second card group that consists of a second predetermined number of cards included in the player's hand; (h) judging whether or not the bonus target card group forms a predetermined combination; and (i) in a case where the bonus target card group forms the predetermined combination, awarding a second prize responsive to the predetermined combination.

According to the inventive card gaming machine, a plurality of cards from among a set of a predetermined number of cards that compose a deck are displayed in accordance with a betting of a game value made by a player and operation at the operating unit. Next, the plurality of cards are associated as either a player's hand or a dealer's hand. In the card gaming machine, winning/losing judgment is made by comparing the player's hand with the dealer's hand. A first prize is awarded to the player based on a result of the winning/losing judgment and the betted gaming value.

In case a side bet of a gaming value is made, bonus target card group is specified in the card gaming machine. In case the bonus target card group forms a predetermined combination, a second prize responsive to the predetermined combination is awarded. Thereby, the card gaming machine can raise the player's expectation in prizes and interest in the card game.

The bonus target card group is specified from a first card group and a second card group that is included in the player's hand. The first card group consists of a first predetermined number of cards that is included in a remaining card group. The remaining card group corresponds to a group of cards that remain after cards dealt out as the player's hand and the dealer's hand are excluded from a set of a predetermined number of cards that compose a deck. That is, presence/absence of the second prize based on the bonus target card group is determined by not only the player's hand but also the remaining card group. As a result, when the player who has made a side bet finds out his/her player's hand, he/she cannot specify the bonus target card group. That is, the player cannot easily anticipate presence/absence of the second prize. Thereby, the card gaming machine can raise the player's expectation in the second prize and interest in the card game.

Furthermore, since "a second prize is awarded irrespective of presence/absence of a first prize" and "a player cannot find out present/absence of the second prize and contents of the second prize from his/her player's hand", the card gaming machine can raise the player's expectation in a high valued prize and interest in the card game.

According to one or more aspects of the present invention, there is provided a card gaming machine comprising: a display for showing a plurality of cards from among a set of a predetermined number of cards that compose a deck; a plurality of operating units, each of which receiving an input of information from a player; and a game controller executing the steps of: (a) associating players' hands, each of which consisting of a predetermined number of cards, with the plurality of operating units, and associating a dealer's hand consisting of the predetermined number of cards with a dealer; (b) receiving a betting of a gaming value made by a player; (c) making winning/losing judgment for an operating unit at which a betting has been made, by comparing a player's hand associated with the operation unit with the dealer's hand; (d) awarding to the player a first prize that is based on a betted gaming value and a result of the winning/losing judgment; (e) receiving a side bet of a gaming value made at the operating unit at which the betting has been made; (f) in a case where the side bet is made, specifying a remaining card group that consists of remaining cards with the players' hands and the dealer's hand being excluded; (g) determining a first card group consisting of a first predetermined number of cards from among the remaining card group; (h) determining a bonus target card group constituted by combining the first card group and a second card group that consists of a second predetermined number of cards included in the player's hand of the operating unit; (i) judging whether or not the bonus target card group forms a predetermined combination; and (j) in a case where the bonus target card group forms the predetermined combination, awarding a second prize responsive to the predetermined combination.

According to the inventive card gaming machine, there are provided a plurality of operating units. Accordingly, plural players can play a game in the card gaming machine by individually operating their respective operating units. That is, in the card gaming machine, each player's hands are associated with each of the operating units and a dealer's hand is associated with a dealer. When a gaming value is bet by a player, winning/losing judgment is made by comparing the player's hand with the dealer's hand. A first prize is awarded to the player based on a result of the winning/losing judgment and the betted gaming value.

In case a side bet of a gaming value is made, a bonus target card group is specified in the card gaming machine. In case the bonus target card group forms a predetermined combination, a second prize responsive to the predetermined combination is awarded to the player. Therefore, a chance of winning a second prize is awarded to a player who has made a side bet, irrespective of presence/absence of the first prize. Thereby, the card gaming machine can raise the player's expectation in prizes and interest in the card game.

The bonus target card group is specified from a first card group and a second card group that is included in the player's hand. The first card group consists of a first predetermined number of cards that is included in a remaining card group. The remaining card group corresponds to a group of cards that remain after cards dealt out as the players' hands associated with the plurality of the operating units and the dealer's hand are excluded from a set of a predetermined number of cards that compose a deck. That is, presence/absence of the second prize based on the bonus target card group is determined by not only the players' hands but also the remaining card group. As a result, when the player who has made a side bet finds out his/her player's hand, he/she cannot specify the bonus target card group. That is, the player cannot easily anticipate presence/absence of the second prize. Thereby, the card gaming machine can raise the player's expectation in the second prize and interest in the card game.

In the card gaming machine, since the remaining card group corresponds to the a group of cards that still remain after cards dealt out as the players' hands associated with the plurality of the operating units and the dealer's hand are excluded from a set of a predetermined number of cards that compose a deck, the remaining card group is constituted by a smaller number of cards. Accordingly, in the gaming machine, the first card group can be determined easily.

Furthermore, since "a second prize is awarded irrespective of presence/absence of a first prize" and "a player cannot find out present/absence of the second prize and contents of the second prize from his/her player's hand", the card gaming machine can raise the player's expectation in a high valued prize and interest in the card game.

According to one or more aspects of the present invention, there is provided a card game playing method comprising the steps of: (a) receiving a betting of a gaming value made by a player; (b) dealing a player's hand consisting of a plurality of cards and a dealer's hand consisting of a plurality of cards to a player and a dealer, respectively from a deck that is composed of a set of a predetermined number of cards; (c) making winning/losing judgment by comparing the player's hand and the dealer's hand; (d) awarding to the player a first prize that is based on a betted gaming value and a result of the winning/losing judgment; (e) receiving a side bet of a gaming value made by the player; (f) in a case where the side bet is made, specifying a remaining card group that consists of remaining cards with the player' hand and the dealer's hand being excluded; (g) determining a first card group consisting of a first predetermined number of cards from among the remaining card group; (h) determining a bonus target card group constituted by combining the first card group and a second card group that consists of a second predetermined number of cards included in the player's hand; (i) judging whether or not the bonus target card group forms a predetermined combination; and (j) in a case where the bonus target card group forms the predetermined combination, awarding a second prize responsive to the predetermined combination.

According to the inventive card gaming playing method, a player's hand and a dealer's hand are dealt out from among a set of a predetermined number of cards that compose a deck in accordance with a betting of a game value made by a player and operation at the operating unit. Next, winning/losing judgment is made by comparing the player's hand with the dealer's hand. A first prize is awarded to the player based on a result of the winning/losing judgment and the betted gaming value.

In case a side bet of a gaming value is made, bonus target card group is specified. Next, it is judged whether or not the bonus target card group forms a predetermined combination. In case the bonus target card group forms the predetermined combination, a second prize responsive to the predetermined combination is awarded. Thereby, a chance of winning a second prize is awarded to a player who has made a side bet, irrespective of presence/absence of the first prize. Thereby, the card game playing method can raise the player's expectation in prizes and interest in the card game.

The bonus target card group is specified from a first card group and a second card group that is included in the player's hand. The first card group consists of a first predetermined number of cards that is included in a remaining card group. The remaining card group corresponds to a group of cards that remain after cards dealt out as the player's hand and the dealer's hand are excluded from a set of a predetermined number of cards that compose a deck. That is, presence/absence of the second prize based on the bonus target card group is determined by not only the player's hand but also the remaining card group. As a result, when the player who has made a side bet finds out his/her player's hand, he/she cannot specify the bonus target card group. Thereby, the card game playing method can raise the player's expectation in the second prize and interest in the card game.

Furthermore, since "a second prize is awarded irrespective of presence/absence of a first prize" and "a player cannot find out presence/absence of the second prize and contents of the second prize from his/her player's hand", the card game playing method can raise the player's expectation in a high valued prize and interest in the card game.

According to one or more aspects of the present invention, there is provided a card game playing method comprising the steps of: (a) receiving a betting of a gaming value made by a player; (b) composing sets of a player's hand each of which consists of a plural number of cards and dealing a player who has bet a gaming value to one of the sets of a player's and dealing and a dealer to a dealer's hand which consists of the plural number of cards; (c) making winning/losing judgment for the player who has bet the gaming value by comparing a player's hand dealt to the player and the dealer's hand; (d) awarding a first prize that is based on a betted gaming value and a result of the winning/losing judgment; (e) receiving a side bet of a gaming value made by the player who has made bet; (f) in a case where the side bet is made, specifying a remaining card group that consists of remaining cards with the sets of a player's hand and the dealer's hand being excluded; (g) determining a first card group consisting of a first predetermined number of cards from among the remaining card group; (h) determining a bonus target card group constituted by combining the first card group and a second card group that consists of a second predetermined number of cards included in the player's hand held by the player; (i) judging whether or not the bonus target card group forms a predetermined combination; and (j) in a case where the bonus target card group forms the predetermined combination, awarding a second prize responsive to the predetermined combination.

According to the inventive card game playing method, there are composed plural players' hands each of which consists of plural cards, from a deck which is composed of a set of a predetermined number of cards. One of the plural players' hands is dealt to a player who has made a bet with a gaming value. Furthermore, the dealer's hand consisting of plural cards is dealt to a dealer, as well. Winning/losing judgment is made by comparing the player's hand of the player who has made a bet with the dealer's hand. A first prize is awarded to the player based on a result of the winning/losing judgment and the betted gaming value.

In case a side bet of a gaming value is made, a bonus target card group is specified. In case the bonus target card group forms a predetermined combination, a second prize responsive to the predetermined combination is awarded to the player. Therefore, a chance of winning a second prize is awarded to a player who has made a side bet, irrespective of presence/absence of the first prize. Thereby, the card game playing method can raise the player's expectation in prizes and interest in the card game.

The bonus target card group is specified from a first card group and a second card group that is included in the player's hand. The first card group consists of a first predetermined number of cards that is included in a remaining card group. The remaining card group corresponds to a group of cards that remain after cards dealt out as the plural players' hands and the dealer's hand are excluded from a set of a predetermined number of cards that compose a deck. That is, presence/absence of the second prize based on the bonus target card group is determined by not only the players' hands but also the remaining card group. Thereby, the card game machine playing method can raise the player's expectation in the second prize and interest in the card game.

In the card gaming machine, since the remaining card group corresponds to the a group of cards that still remain after cards dealt out as the plural players' hands and the dealer's hand are excluded from a set of a predetermined number of cards that compose a deck, the remaining card group is constituted by a smaller number of cards. Accordingly, in the card game playing method, the first card group can be determined easily.

Furthermore, since "a second prize is awarded irrespective of presence/absence of a first prize" and "a player cannot find out present/absence of the second prize and contents of the second prize from his/her player's hand", the card game playing method can raise the player's expectation in a high valued prize and interest in the card game.

One or more of the above aspects of the invention is more fully described in the following detailed description when read in connection with the accompanying drawings. It is to be expressly understood, however, that the drawings are for purpose of illustration only and not intended as a definition of the limits of the invention.

BRIEF DESCRIPTION OF THE DRAWINGS

FIG. 13 is an explanatory view showing a table for determining bonus contents of a card gaming machine in accordance with an embodiment of the present invention;

DETAILED DESCRIPTION

An embodiment of a card gaming machine of the present invention implemented as a multi-user card gaming machine will now be described in detail with reference to the accompanying drawings.

First, a card gaming machine 1 according to an embodiment will be outlined in detail with reference to drawings. As aforementioned, the card gaming machine 1 according to this embodiment is a kind of multi-user card game machines (refer to FIG. 2). Thus, the card gaming machine 1 comprises a plurality of terminals 4 (6 terminals in this embodiment) to receive inputs from players.

And Pai Gow Poker, one of card games, is played in the card gaming machine. First, each player bets a predetermined number of chips. Then seven cards are dealt to each player as a player's hand. Players set classify their cards into a set of a five-card (high hand) and a two-card (low hand). The players' hands are then compared with the dealer's hand to judge winning/losing. In this regard, the dealer's hand is also composed of seven cards as same as the player's hand, and divided into a two-card low hand and a five-card high hand (refer to FIG. 1).

If a player has higher hand in both high hand and low hand than the dealer's hands, it is judged as player's winning and a payout is made according to bet amount. If a player has only one higher hand (either high hand or low hand) than the dealer's, it is judged as draw. And if a player has lower hands in both high and low hands than the dealer's hands, it is judged as player's losing.

To start a card game played in the card gaming machine 1, seven cards are dealt to each of six terminals 4 from a deck of a predetermined number of cards (fifty-three cards in this embodiment). As discussed earlier, seven cards from the deck are also dealt to the dealer. That is, a total of six sets of the player cards, each set being composed of seven cards, and one set of the dealer card being composed of seven cards are dealt to the dealer and the players from a deck of fifty-three cards. This means that there are four cards left out in the deck, which do not belong to any of the player and dealer's hands.

In the interest of convenience, these four remaining cards that belong to neither the player's hands nor the dealer's hands are called a "remaining card group" throughout this patent document.

Figure 1:
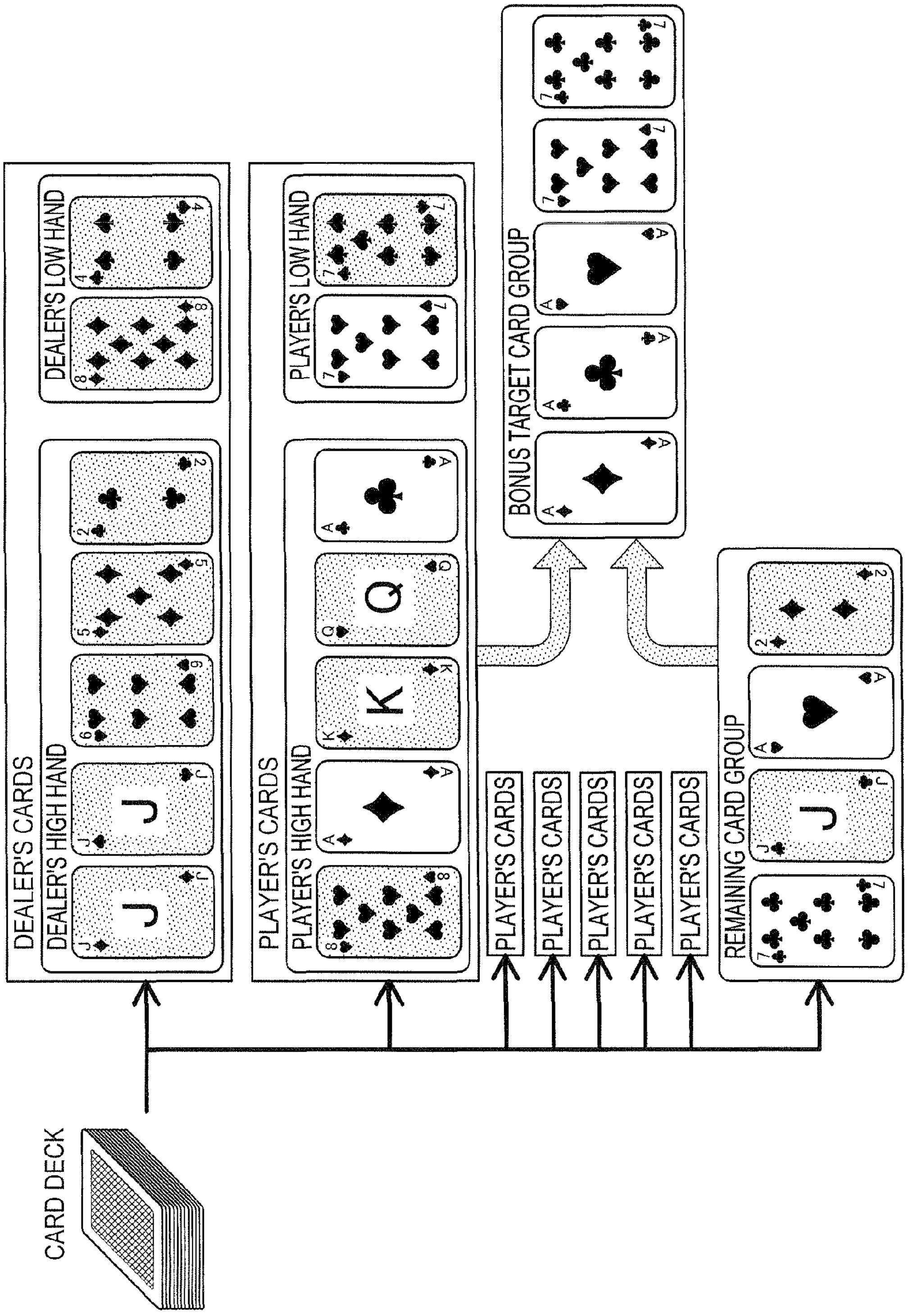
FIG. 1 is an explanatory view showing a game concept of a card gaming machine, in accordance with an embodiment of the present invention.

In a game played in the card gaming machine 1 of this embodiment, when a side bet is made by a player, a predetermined number of cards (five cards in this embodiment) are selected from the above described remaining card group and the player's hand of the player who made a side bet (refer to FIG. 1). A bonus target card group composed of these five cards is judged by examining whether a predetermined combination (refer to FIG. 13) has been formed or not. Next, a player is awarded a prize as a bonus payout for the card combination formed with the bonus target card group, irrespective of winning/losing judgment obtained by comparing the player and dealer's hands.

For instance, as illustrated in FIG. 1, there are selected two cards (i.e. "7 of Clubs" and "Ace of Hearts") out of the remaining card group that is composed of four cards. Further, there are selected three cards such as "Ace of Diamonds", "Ace of Clubs", and "7 of Hearts" from the player's hand.

Thus, the bonus target card group is composed of five cards selected out of the remaining card group and the player's hand. In case of an example shown in FIG. 1, the bonus target card group is composed of five cards, namely, "Ace of Diamonds", "Ace of Clubs", "Ace of Hearts", "7 of Hearts", and "7 of Clubs". In this case, the bonus target card group has a "Full House" combination (refer to FIG. 13), so "100" credits are awarded to a player as a bonus payout, irrespective of presence/absence of prize in Pai Gow Poker (i.e. winning/losing judgment result).

As one can learn from the example in FIG. 1, the card gaming machine 1 of this embodiment may award a bonus payout, irrespective of presence/absence of prize in Pai Gow Poker. In this way, the card gaming machine 1 contributes to increasing expectation for the payout and improving interest in the game.

Particularly, the bonus target card group is characterized by consisting of two cards (hereinafter, referred to as a first card group) that are selected from the remaining card group and three cards (hereinafter, referred to as a second card group) that are selected from a player high hand. Unless a player knows the dealer's hand and the other players' hands, he cannot figure out what the remaining card group is composed of.

Therefore, it is difficult for players to figure out or even predict the complete combination of the bonus target card group which includes the first card group selected from the remaining card group. As players do not know the combination (i.e. a possible combination) of the bonus target card group, it is not easy any more for them to figure out whether there would be a bonus payout or a value of prize for the bonus payout. In other words, with this type of the card gaming machine 1, players may have expectations and tense excitement for high payouts, being brimming over with enthusiasm.

Figure 2:
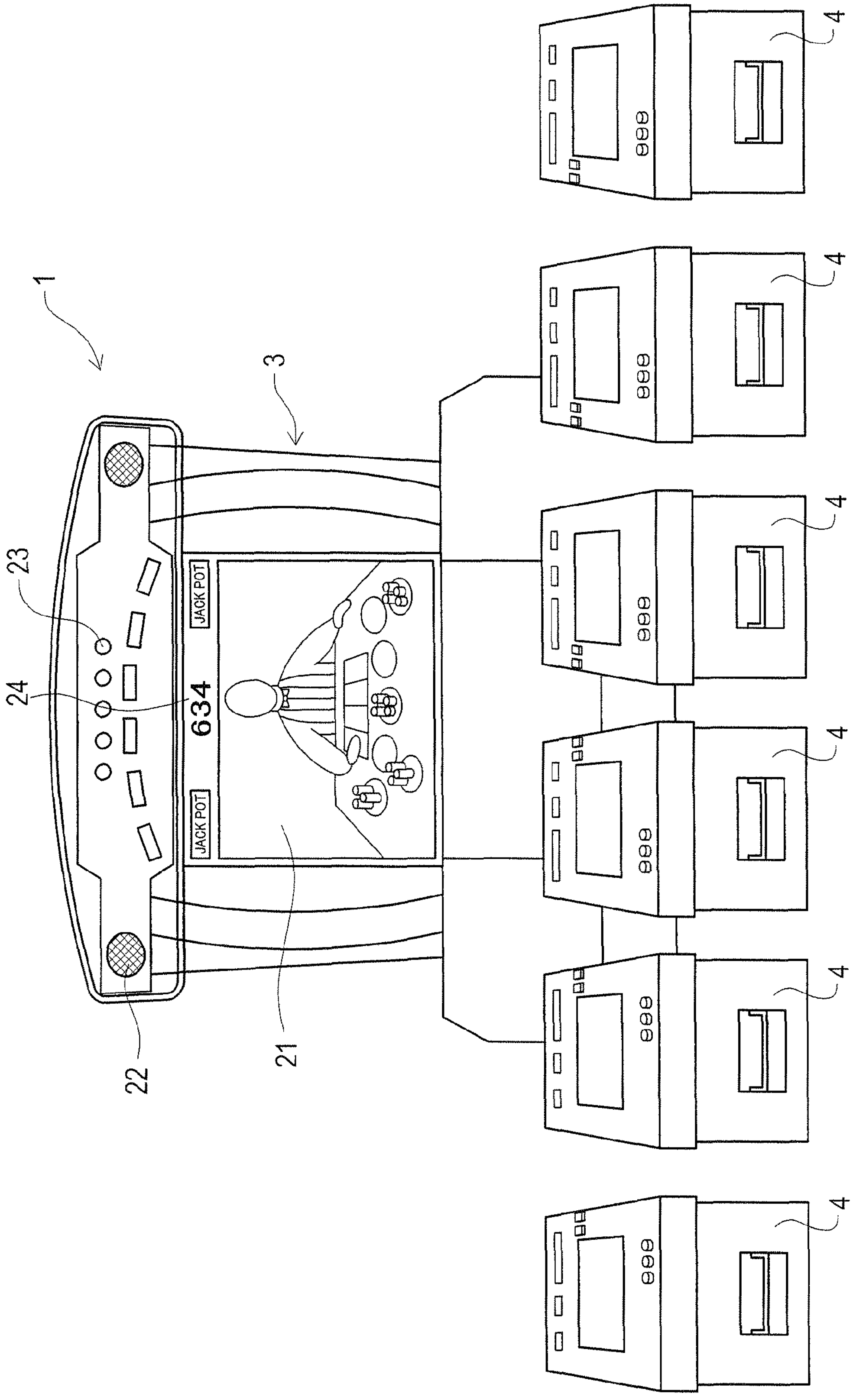
FIG. 2 shows an exterior view of the card gaming machine, in accordance with the embodiment of the present invention.

The following will now explain the overall construction of the card gaming machine 1 of this embodiment in further detail with reference to drawings. FIG. 2 is an exterior view of the card gaming machine 1 according to the present invention.

Referring to FIG. 2, the card gaming machine 1 basically includes a panel 3 and a plurality of (e.g., six) terminals 4. The terminal 4 is for a player to play a game, while sitting down. The panel 3 is placed in front of players seated at the terminals 4, so as to display, say, an animation image of a virtual dealer. Each terminal 4 is also called a satellite.

Figure 3:
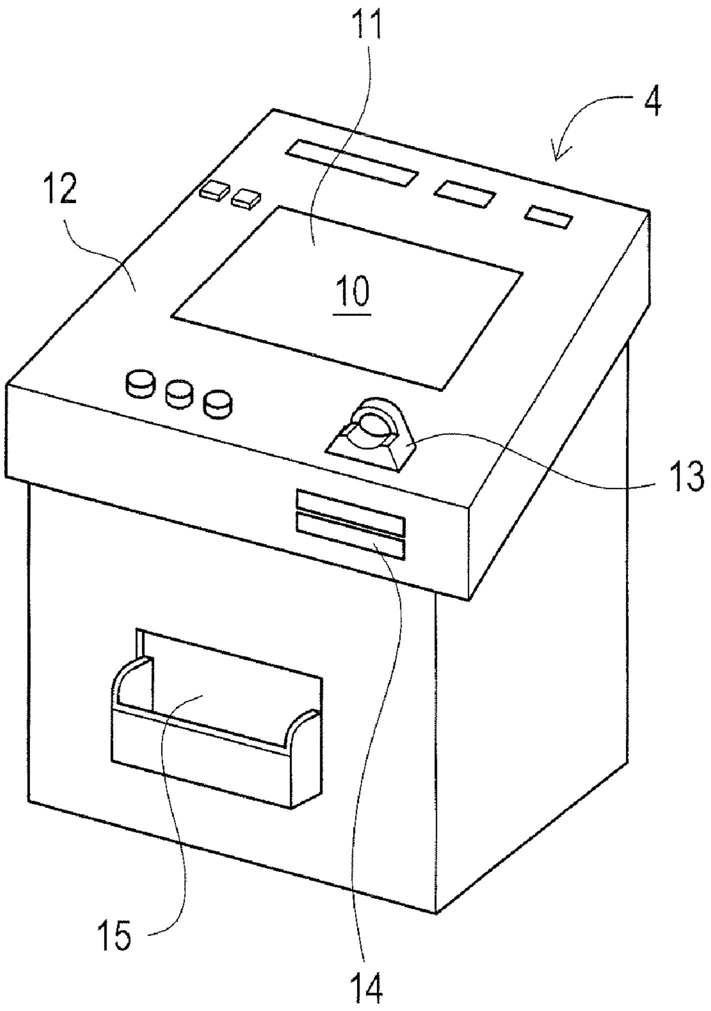
FIG. 3 shows an exterior view of a terminal, in accordance with the embodiment of the present invention.

A description of the construction of the terminal 4 in the card gaming machine 1 will now be given. FIG. 3 is an exterior view of a terminal 4 according to the present invention. In this embodiment, all terminals have the same construction.

Referring to FIG. 3, the terminal 4 comprises a liquid crystal display 10, a touch panel 11, operating buttons 12, a coin slot 13, a bill slot 14, and a coin payout tray 15. The liquid crystal display 10 is a display device to display a game screen (refer to FIGS. 6 and 7, which will be described later), a bonus game screen (refer to FIGS. 12 and 14, which will be described later), game results and so on. The touch panel 11 is disposed at the front surface of the liquid crystal display 10. The touch panel 11 is used to press buttons shown on the liquid crystal display 10 for choosing a bet target (bet or side bet) or setting a bet. That is to say, the touch panel 11 constitutes an operation unit for choosing a bet target or setting a bet. And the operating buttons 12 are used for a payout operation for example. The coin slot 13 is where coins or medals are inserted. Likewise, the bill slot 14 is where bills are inserted. The coin payout tray 15 is where coins or medals at an amount corresponding to the credit that has been deposited in result of actuating the payout operation are paid out to a player.

Meanwhile, the panel 3 is constituted by a front display 21, speakers 22, and LEDs 23. The front display 21 displays all kinds of images required to play a card game. For instance, an animation image of a dealer who deals out cards or dispenses chips, or the dealer's hand may be displayed on the front display 21 (refer to FIG. 8).

The speakers 22 are located on an upper portion of the front display 21 to output music and/or a sound effect along game progresses. And the LEDs 23 are lightened whenever needed for presentations to exert dramatic effects.

Moreover, a JP amount display section 24 is provided at an upper portion of the front display 21. Here, in the card gaming machine 1 of this embodiment, 5% of bet amount is pooled in the pot. In the case that a player makes a side bet and has a card combination of a bonus target card group (to be described), "Royal Straight Flush", the player wins a jackpot (refer to FIG. 13). In this case, the pooled amount is paid out at once. Further, the JP amount display section 24 shows a pooled amount currently pooled in a pot.

The card gaming machine 1 of this embodiment uses cards same as trump cards used widely. As a rule, each card has a "suit" and a "number" (refer to FIGS. 1 and 7).

A "suit" indicates a symbol each trump card bears, and is divided into 4 categories like spades, hearts, diamonds, and clubs.

A "number" indicates a number or an alphabet printed on a trump card, and the numbers 1 to 13 are allocated, namely, A (Ace, which corresponds to 1), 2, 3, 4, 5, 6, 7, 8, 9, 10, J (Jack, which corresponds to 11), Q (Queen, which corresponds to 12), and K (King, which corresponds to 13).

Therefore, in playing the trump card, a type of a card is specified based on combinations of "suit" and "number". For instance, there are "A of Hearts", "K of Spades", etc. It is assumed that a full set or deck of cards is composed of 53 cards, namely, 52 cards, split evenly into four suites of 13 cards bearing one of 13 different numbers, plus 1 joker.

The following will now give a description on a method for playing a game with the card gaming machine 1. First, player's hands directed to each terminal 4 and dealer's cards are associated (i.e., player's hands and dealer's hand are dealt out). Thus, a remaining card group for this game is specified in the card gaming machine 1.

A player is seated front of a terminal 4 to bet with desired amount of bet by using a betting screen displayed on the liquid crystal display 10. Then in the front display 21, an image of cards (e.g., seven cards) dealt to the dealer is displayed.

Meanwhile, in a liquid crystal display 10 of each terminal 4, an image of seven cards dealt to a player is displayed.

Then, at the terminal 4, through the touch panel 11, there is carried out division change operation in which combination of dividing player's hand into player's high hand and player's low hand is changed. Similarly, cards being dealt to the dealer are divided into the dealer's high hand and the dealer's low hand. Then high and low hands of the players are compared with the high and low hands of the dealer, so as to make winning/losing judgment based on number and symbol of individual card.

Based on the winning/losing judgment result, an image of declaring either player's winning or dealer's winning or an image of declaring draw game is displayed in the liquid crystal display 10 or the front display 21. In each one of terminals 4, if a player won the dealer, the player wins credits twice as large as the bet (the number of credits) he had placed. On the other hand, if a player lost the dealer, no prize is awarded to the player. And if a player ends in a draw against the dealer, the last bet is returned to the player.

In playing Pai Gow Poker, if players made a side bet, a first card group consisting of two cards from the remaining card group is specified. Furthermore, a second card group consisting of three cards from the player's hand is specified. And a bonus target card group consisting of five cards is determined based on the first and second card groups. If a player has a predetermined combination (refer to FIG. 13) for the bonus target card group, a bonus payout is awarded to the player according to the combination.

Figure 4:
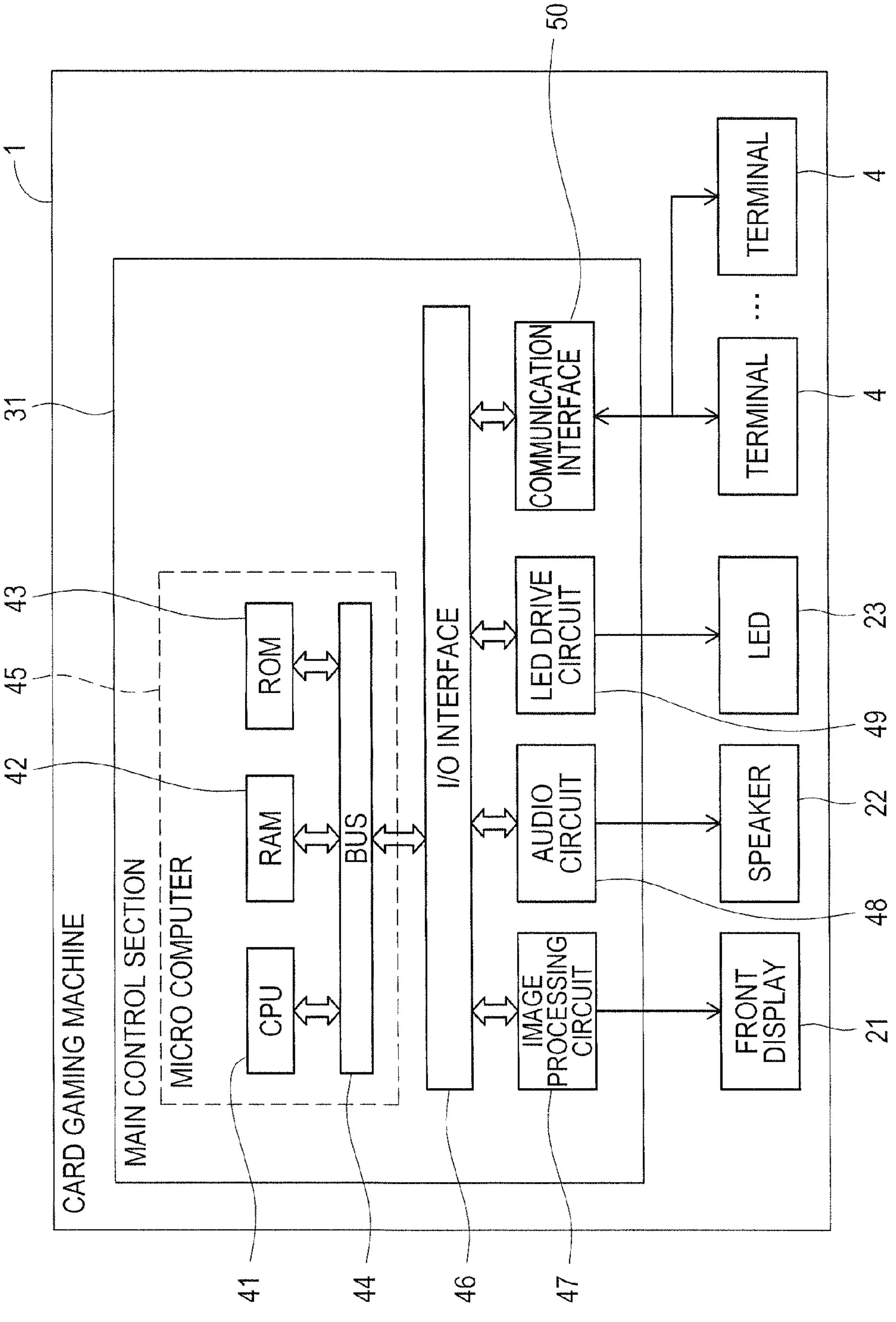
FIG. 4 is a schematic block diagram showing a control system in a card gaming machine, in accordance with the embodiment of the present invention.

The construction of a control system in a card gaming machine 1 will now be explained in detail with reference to drawings. FIG. 4 is a schematic block diagram of the control system in the card gaming machine 1 according to the present invention.

Referring to FIG. 4, a card gaming machine 1 according to this embodiment comprises a main control section 31, a plurality of terminals 4 connected to the main control section 31, and all kinds of peripherals.

The main control section 31 comprises a microcomputer 45 as its core.

Basically, the microcomputer 45 is constituted by CPU 41, RAM 42, ROM 43, and a bus 44 for data transmission between them. And the ROM 43 stores all kinds of programs, data tables, etc., which are required to control the card gaming machine 1.

The CPU 41 is a processing unit to execute all kinds of control programs and has a key role in the control by the microcomputer 45. The RAM 42 is a memory to temporarily store all data that have been processed in the CPU 41. The ROM 43 memorizes image data of face-up and back of each of all the cards used as player's hand and the dealer's hand.

Here, the CPU 41 is connected to an image processing circuit 47, an audio circuit 48, an LED drive circuit 49, and a communication interface 50, respectively, through an I/O interface 46.

The image processing circuit 47 is to control a display pattern of the front display 21, under control of the CPU 41. That is, the CPU 41 controls display of the front display 21 through the image processing circuit 47 so that the front display 21 may display a dealer image 102 and so on (refer to FIG. 8). The audio circuit 48 is to carry out drive control of the speakers 22, under control of the CPU 41. That is, the CPU 41 controls the speakers 22 through the audio circuit 48 so that the speakers 22 may output music and/or a sound effect as a game progresses. The LED drive circuit 49 is to control lighting pattern of LEDs 23. That is, the CPU 41 controls the lighting state of LEDs 23 through the LED drive circuit 49 so that the LEDs may be lightened to bring a prepared presentation as a game progresses.

Lastly, the communication interface 50 is to transmit/receive all kinds of data between each one of terminals 4 and the main control section 31. Therefore, all kinds of information such as information on betting operations from individual terminals 4 are communicated with the main control section 31 through the communication interface 50.

Figure 5:
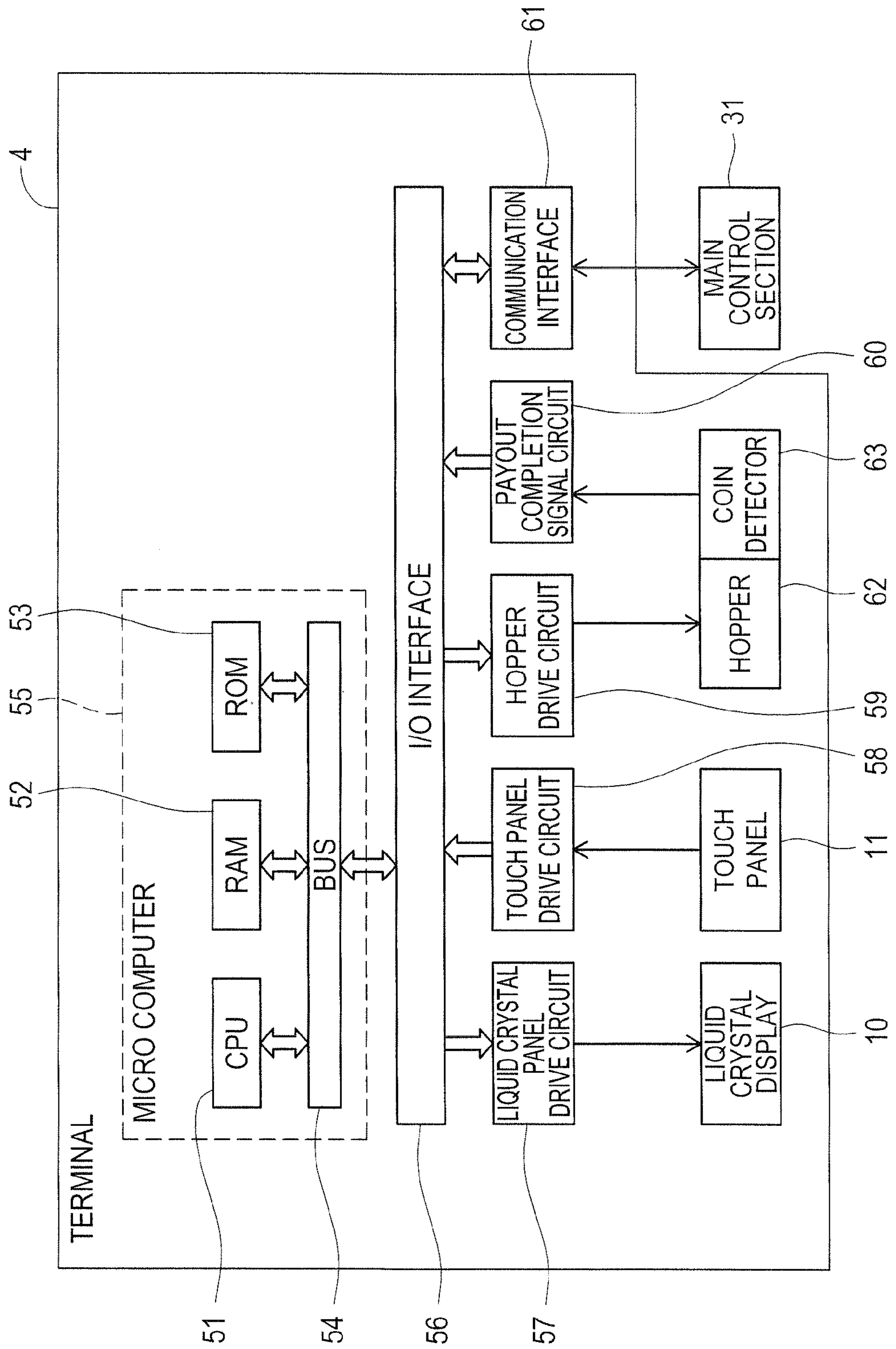
FIG. 5 is a schematic block diagram showing a control system of a terminal, in accordance with the embodiment of the present invention.

Next, a detailed description on the construction of a control system for a terminal 4 will be given. FIG. 5 is a schematic block diagram illustrating a control system for the terminal 4 according to the present invention.

Referring to FIG. 5, the terminal 4 of this embodiment comprises a microcomputer 55 as its core. The microcomputer 55 is constituted by CPU 51, RAM 52, ROM 53, and a bus 54 for data transmission between them. And the ROM 53 stores all kinds of programs, data tables, etc., which are required to control the terminal 4. The CPU 51 is a processing unit to execute all kinds of control programs and has a key role in the control by the microcomputer 55. The RAM 52 is a memory which temporarily stores all kinds of data having been operated in the CPU 51, in addition to the number of credits currently being deposited at the terminal 4, a bet target (i.e. bet or side bet) made by each player, and a bet (the number of credits) placed on the bet target.

Also, the CPU 51 is connected to a liquid crystal panel drive circuit 57, a touch panel drive circuit 58, a hopper drive circuit 59, a payout completion signal circuit 60, and a communication interface 61, respectively, through an I/O interface 56.

The liquid crystal panel drive circuit 57 is connected to the Liquid crystal display 10, through which a display pattern of the liquid crystal display 10 is controlled. The touch panel drive circuit 58 is connected to a touch panel 11. The touch panel drive circuit 58 senses player operation on the touch panel 11 so that an appropriate control corresponding to the operation may be done. The hopper drive circuit 59 is connected to a hopper 62, through which the hopper 62 is controlled when coins are paid out to the coin payout tray 15. The payout completion signal circuit 60 is connected to a coin detector 63. Thus, when the coin payout tray 15 receives a predetermined number of coins, the payout completion signal circuit 60 sends a payout completion signal to indicate that a payout has completely been made.

Finally, the communication interface 61 is used to transmit/receive all kinds of information between the terminal 4 and the main control section 31. For example, bet information based on operation data that are outputted from the touch panel 11 is transmitted to the main control section 31 through the communication interface 61.

There will be described a game screen 70 which is displayed in the liquid crystal display 10 of the terminal 4 in playing Pai Gow Poker using the card gaming machine 1 of this embodiment in detail with reference to a drawing.

The card gaming machine 1 allows players to carry out all kinds of operations such as bet operation, division change operation by using the game screen 70 and the touch panel 11. Here, bet operations include placing player's credits in a bet and/or a side bet by using the game screen 70 and the touch panel 11. Moreover, the division change operation is to divide seven player's cards into desired combination of five cards of player's high hand and two cards of player's low hand by using sing the game screen 70 and the touch panel 11.

Figure 6:
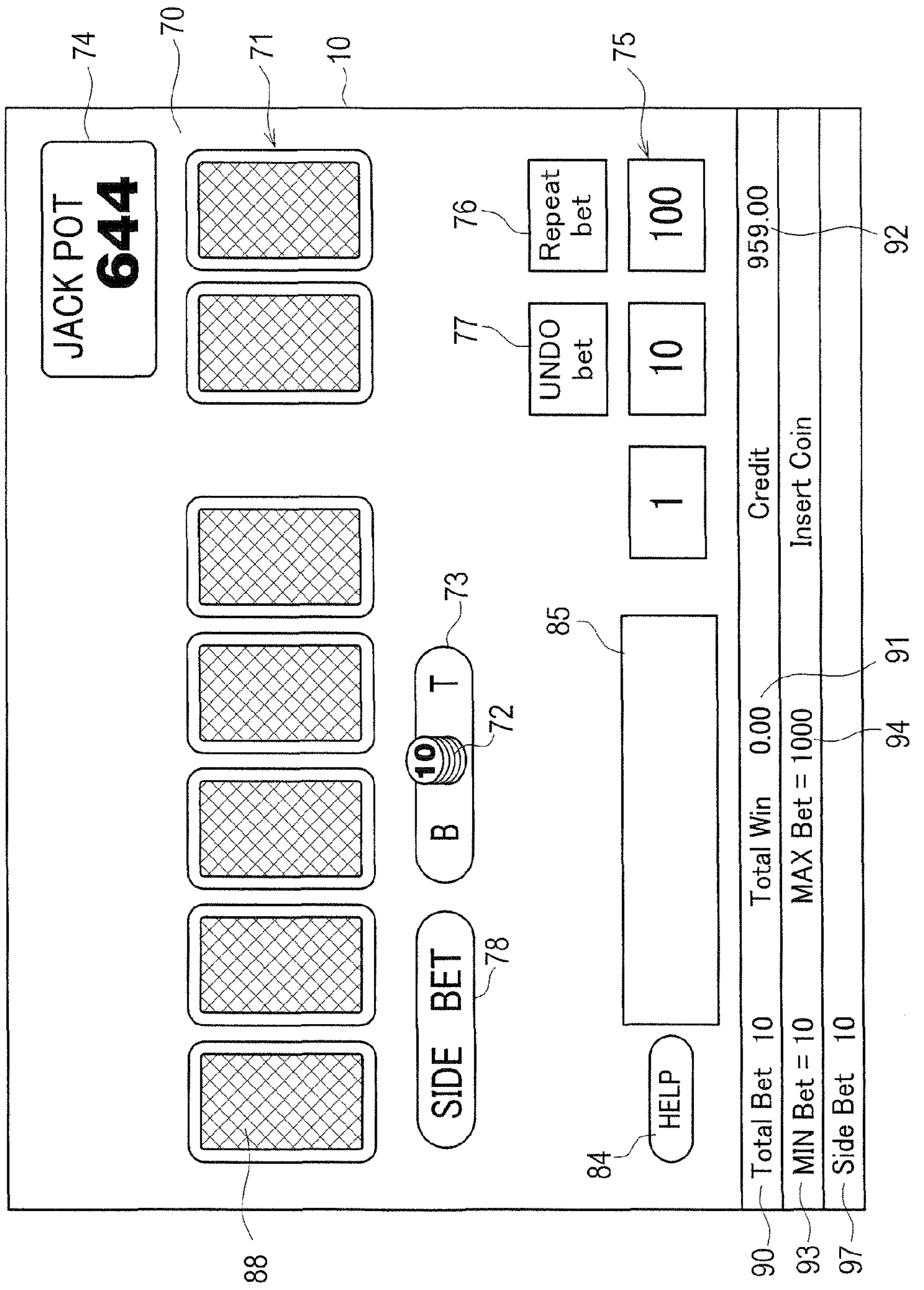
FIG. 6 is an explanatory view (1) of a game screen that is provided on a liquid crystal display of a terminal, in accordance with the embodiment of the present invention.
Figure 7:
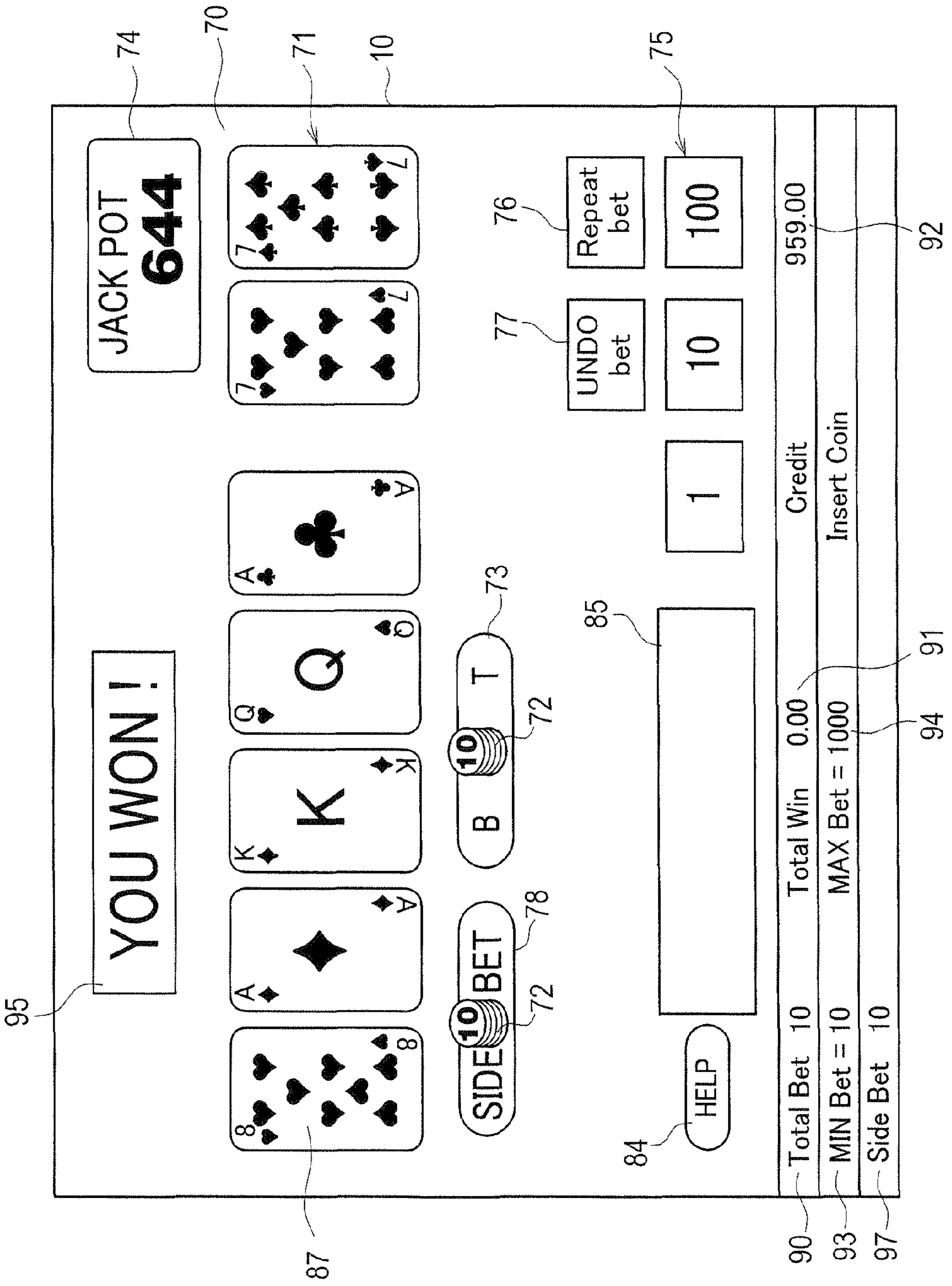
FIG. 7 is an explanatory view (2) of a game screen that is displayed on a liquid crystal display of a terminal, in accordance with the embodiment of the present invention.

As shown in FIGS. 6 and 7, the game screen 70 comprises a player's hand display area 71, a bet display area 73, a side bet display area 78, a pooled amount display area 74, and an information display area.

The player's hand display area 71 shows seven cards being dealt to a player in playing Pai Gow Poker. To be more specific, the player's hand display area 71 is where face-up images 87 and back face images 88 of cards of a player (refer to FIGS. 6 and 7) are displayed. The bet display area 73 shows a chip image 72 at an amount corresponding to the number of chips a player bet on Pai Gow Poker. The side bet display area 78 shows a chip image 72 bet on a side bet by a player. The pooled amount display area 74 shows a pooled amount in a pot.

Lastly, the information display area shows a variety of operating buttons such as bet buttons 75, Repeat bet button 76, etc., and information on a player such as a Bet amount display area 90, etc.

As discussed earlier, the player's hand display area 71 is where face-up images 87 and back face images 88 of cards being dealt to a player are displayed. As shown in FIG. 6, the back face images 88 do not show any number and suit. Needless to say, if back face images 88 are displayed, a player cannot see numbers and or suits of the player's hand. On the other hand, face-up images 87 as shown in FIG. 7 include numbers and suits. Thus, if face-up images 87 are displayed, a player can see numbers and suits of individual cards in the player's hand.

When a game starts, the card gaming machine 1 provides back face images 88 of seven cards on the player's hand display area 71 of terminal 4 a player is seated at. And after a predetermined time period has lapsed, the back face images 88 of cards which were displayed on the player's hand display area 71 are turned over and replaced with face-up images 87, correspondingly to the player's hand dealt the terminal 4. That is to say, the player's hand display area 71 now shows seven cards that are dealt to a player playing at the terminal 4.

Further, by operating the touch panel 11, the player's hand displayed in the player's had display area 71 can be divide and classified into player's high hand and player's low hand. It is to be noted that division into player's hand and player's low hand can be made freely.

For instance, referring back to FIGS. 6 and 7, five cards arranged at the left hand side of the game screen 70 are designated as a player's high hand, while two cards arranged at the right hand side of the game screen 70 are designated as a player's low hand. At this time, a player operates the touch panel 11 to rearrange these seven cards displayed on the player's hand display area 71 to make a change in the high and low hands.

As described above, the bet display area 73 shows a chip image 72 corresponding to a bet amount bet by a player in playing Pai Gow Poker (e.g., chips equivalent to 10 credits as shown in FIGS. 6 and 7). To make a bet, a player chooses a bet amount by means of bet buttons 75 to be described later and touches a portion of the touch panel 11 corresponding to the bet display area 73 to determine bet amount.

That is, the portion of the touch panel 11 assigned to the bet display area 73 functions as a bet target selecting unit (i.e. betting in Pai Gow Poker). The bet determined in this manner is then sent to the main control section 31.

The side bet display area 78 shows an chip image 72 at an amount corresponding to a bet amount bet as a side bet (e.g., chips equivalent to 10 credits as shown in FIG. 7). To make a side bet, a player chooses a bet amount by means of bet buttons 75 to be described later and touches a portion of the touch panel 11 corresponding to the side bet display area 78 to determine a bet amount for the side bet. That is, the portion of the touch panel 11 assigned to the side bet display area 78 also functions as a bet target (i.e. side bet) selecting unit. The bet determined in this manner is then sent to the main control section 31.

The pooled amount display area 74 is where a pooled amount pooled in a pot is displayed. In particular, the card gaming machine 1 of this embodiment pools 5% of a bet placed by a player in a pot.

Further, a plurality of bet buttons 75 (e.g., three different values of credits such as "1" credit, "10" credits, and "100" credits are provided in this embodiment) are disposed on the right hand side below the bet display area 73. As such, a player can select bet amount in a game by touching these bet buttons 75.

In addition, a Repeat bet button 76 and an UNDO bet button 77 are provided above the bet buttons 75. The player may bet the same amount of bet as before by touching the Repeat bet button 76. The player may freely cancel a preceding bet operation by touching an UNDO bet button 77.

As one can see in FIGS. 6 and 7, there is a HELP button 84 on the left hand side below the bet display area 73. The HELP button 84 is used when it is required to display how to operate the card gaming machine 1 in the liquid crystal display 10. Also, there is a message area 85 on the right side of the HELP button 84. The message area 85 provides a message to support a game to progress smoothly.

The bottom of the game screen 70 is provided with a bet amount display area 90, a winning amount display area 91, a credit amount display area 92, a minimum bet amount display area 93, a maximum bet amount display area 94, and a side bet amount display area 97.

The bet amount display area 90 shows a total amount of bet placed on a current game of Pai Gow Poker by a player. The winning amount display area 91 shows an amount a player won as a prize. The credit amount display area 92 shows a value of credits currently available to a player. The minimum bet amount display area 93 shows a lower limit of a possible bet a player can place. The maximum bet amount display area 94 shows an upper limit of a possible bet a player can place.

The Side Bet display area 97 shows an amount of the side bet made on a current game by a player.

Referring to FIG. 7, the game screen 70 also comprises a winning/losing display area 95 above the player's hand display area 71. The winning/losing display area 95 provides a winning/losing result between a player and the dealer in a last game. For example, if a player wins, the winning/losing display area 95 displays "YOU WON!" (refer to FIG. 7). On the contrary, if a player loses, a string, "YOU LOST!" is displayed. Meanwhile, if a game ends in a draw between a player and the dealer, "DRAW", is displayed.

Figure 8:
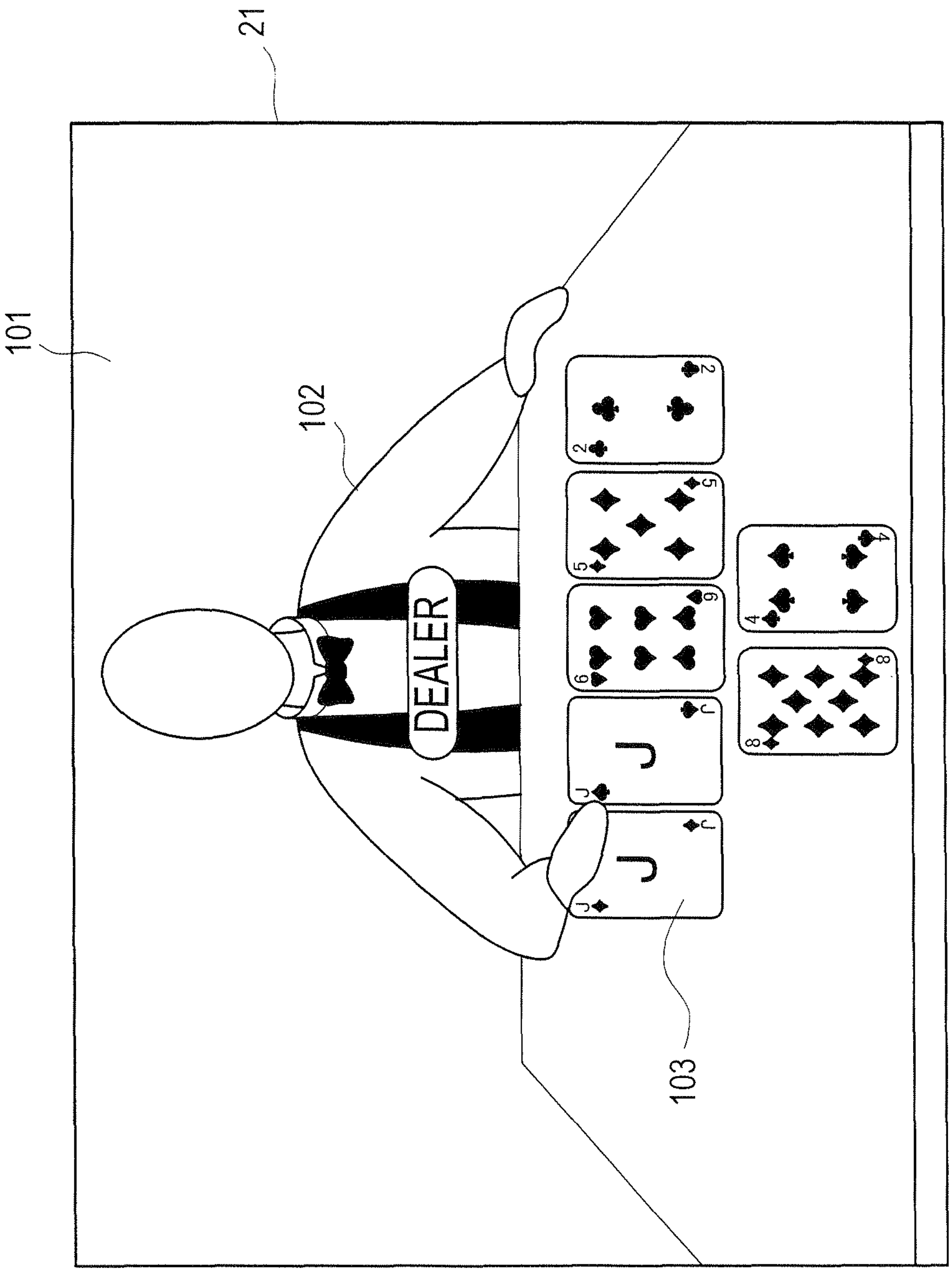
FIG. 8 graphically shows a main screen that is displayed on a front display panel, in accordance with the embodiment of the present invention.

A main screen 101 shown on a front display 21 in playing Pai Gow Poker with the card gaming machine 1 according to this embodiment will now be explained in reference to a drawing. FIG. 8 is an explanatory view of the main screen 101 that shows on the front display 21.

As described above, the card gaming machine 1 of this embodiment displays a dealer image 102 on the front display 21. This dealer image 102 is a virtual image of the dealer, being animate in connection with the progress of a game. In this manner, the card gaming machine 1 can enhance sense of real game atmosphere.

Also, the main screen 101 provides a dealer's hand image 103 at its central portion. This dealer's hand image 103 shows cards dealt to the dealer. In this card gaming machine 1, the dealer's hand is also composed of seven cards like each player's hand. According to house rules, the dealer's cards are arranged into a high hand and a low hand and displayed on the main screen 101. In an example shown in FIG. 8, the top five cards belong to the dealer's high hand, and the bottom two cards belong to the dealer's low hand.

Figure 9:
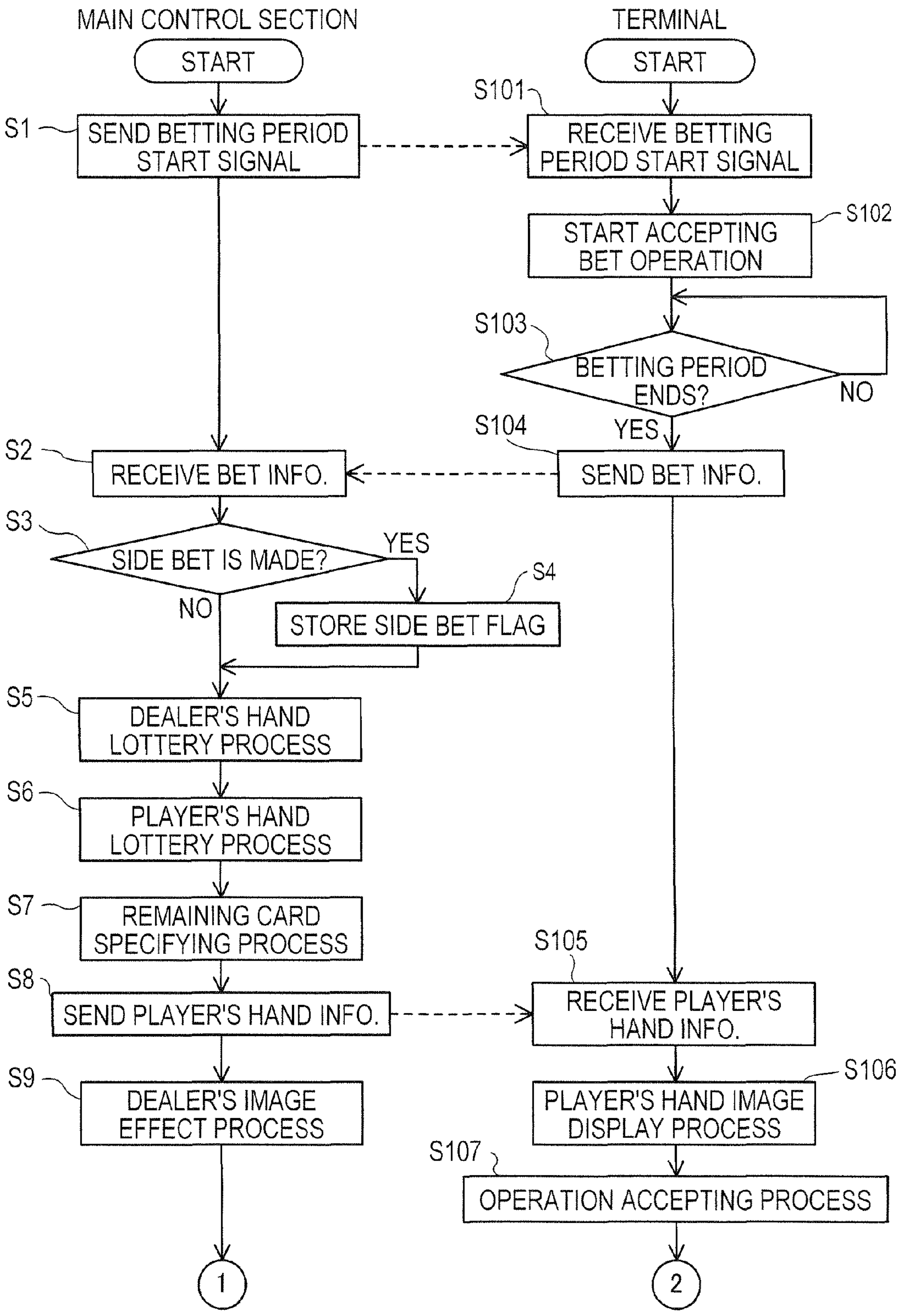
FIG. 9 is a flow chart (1) of a game processing program for a card gaming machine, in accordance with an embodiment of the present invention.
Figure 10:
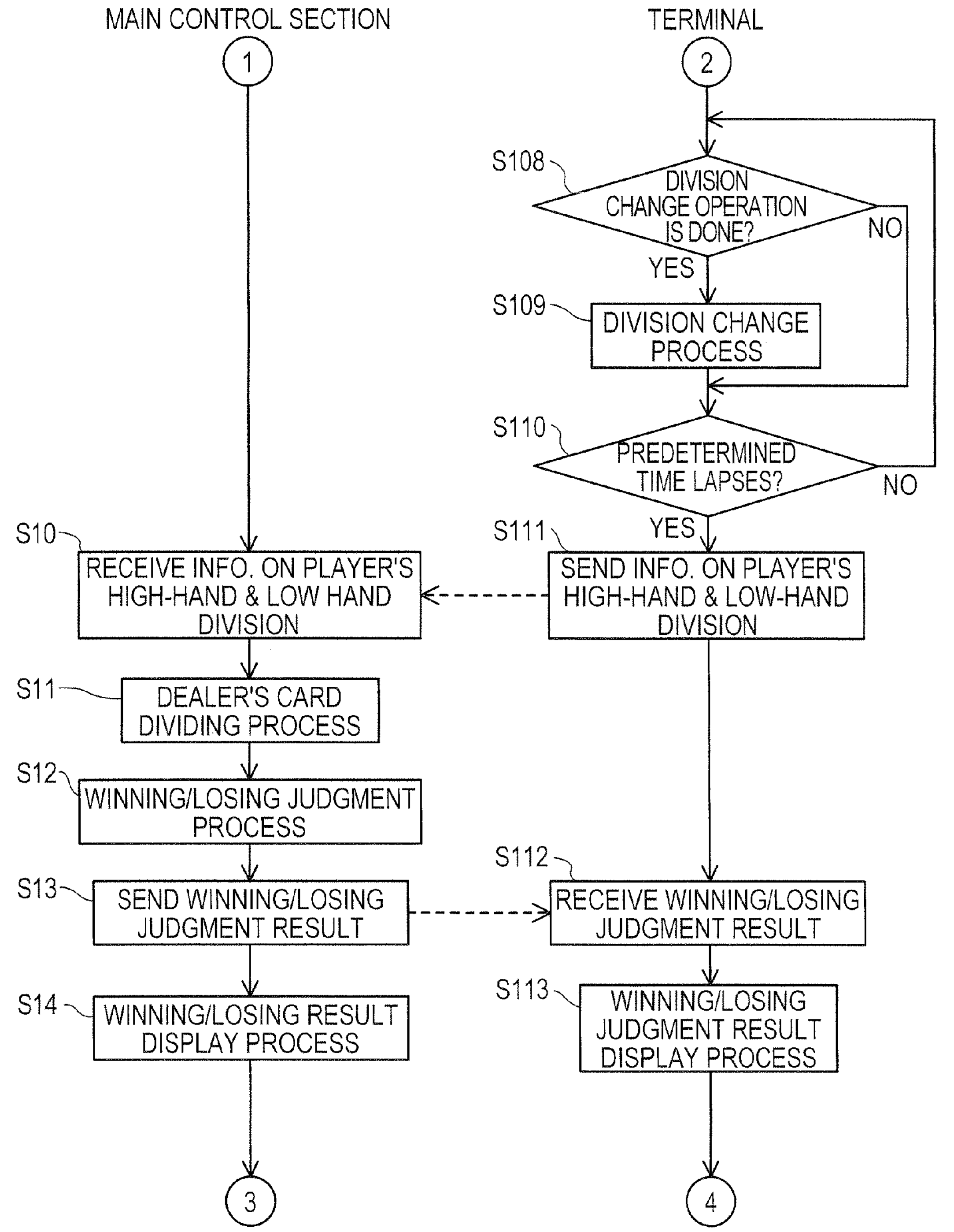
FIG. 10 is a flow chart (2) of a game processing program for a card gaming machine, in accordance with an embodiment of the present invention.
Figure 11:
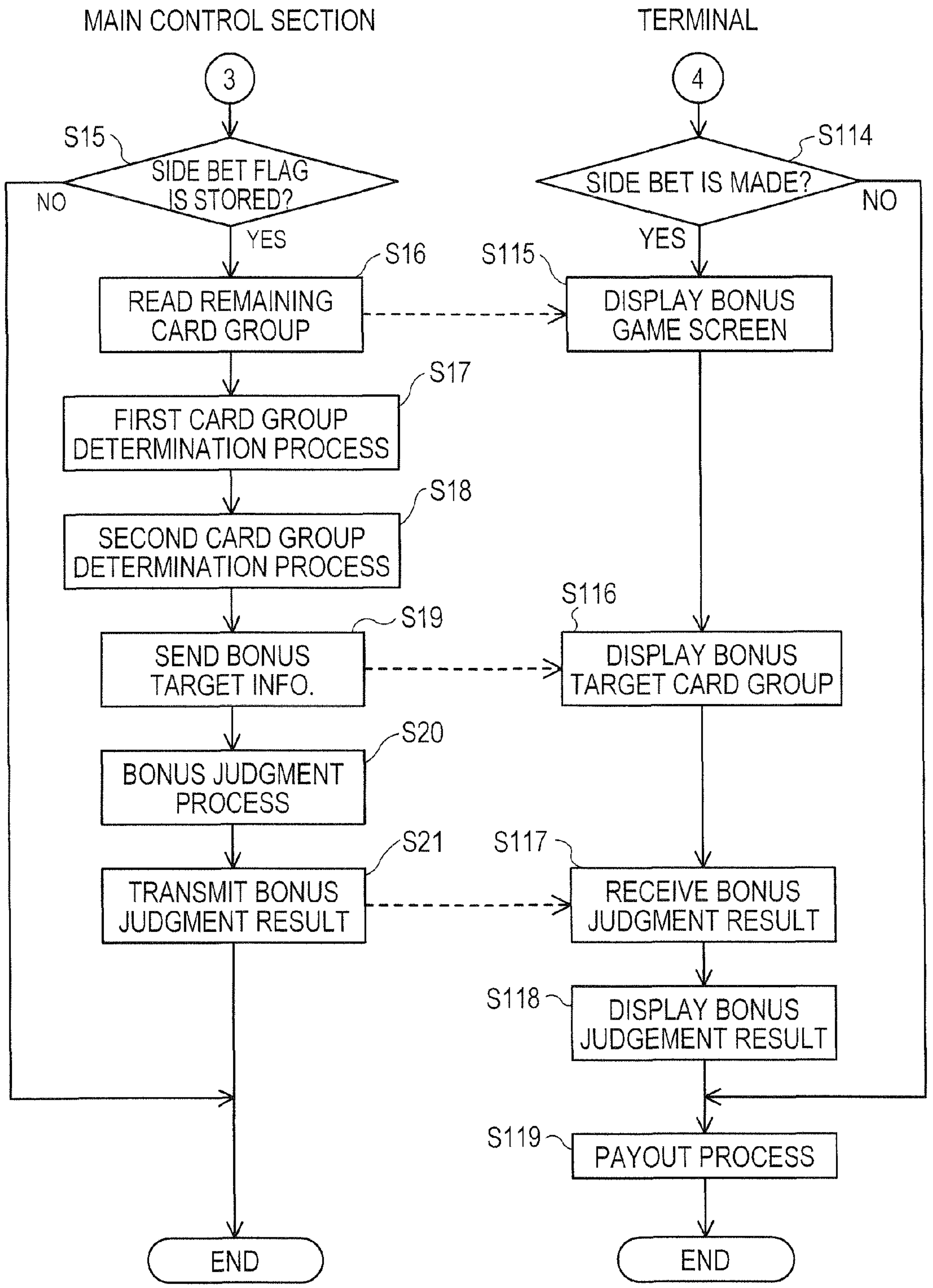
FIG. 11 is a flow chart (3) of a game processing program for a card gaming machine, in accordance with an embodiment of the present invention.

A game processing program in the card gaming machine 1 of this embodiment will now be explained in detail with reference to drawings. FIGS. 9 through 11 describe a game processing program executed by a CPU 41 of a main control section 31, and a game processing program executed by a CPU 51 of a terminal 4, respectively.

All the programs described in flow charts of FIGS. 9 through 11 are stored either in RAM 42 or ROM 43 of the main control section 31 or in RAM 52 or ROM 53 of the terminal 4, to be executed by the CPU 41 or the CPU 51.

First, a game processing program executed in the main control section 31 will be explained. As shown in FIG. 9, in S1, the CPU 41 sends each terminal 4 a command to start a betting period so that players may start a betting operation.

Next, in S2, the CPU 41 receives bet information from each terminal 4. Here, the bet information includes a bet amount (the number of credits) bet by a player. Moreover, the bet information includes information on whether there is a side bet in terminal 4 and side bet amount made on the side bet.

The bet information provided from the terminals 4 is temporarily stored in the RAM 42.

In S3, the CPU 41 determines whether a side bet is made during the betting period. To be more specific, the CPU 41 specifies the availability of a side bet, referring to the bet information received from each terminal 4 and stored in the RAM 42. If a side bet was made (S3: YES), the CPU 41 matches a side bet flag indicating that a side bet has been made with a terminal 4 where the side bet is made and stores it in the RAM 42 (S4). Next, the CPU 41 proceeds to S5. On the contrary, if a side bet is not made (S3: NO), the CPU 41 proceeds directly to a subsequent S5.

In S5, the CPU 41 carries out a dealer's hand lottery process. The dealer's hand lottery process (S5) is to determine seven cards (i.e. the dealer's hand) by a lottery. For instance, suppose that there is a deck of cards composed of N cards (N=53 in Pai Gow Poker). Then each one of cards in the deck is numbered from "1" through "N".

And the CPU 41 extracts seven random numbers from "1" through "N", and sets seven cards corresponding to those extracted numbers as the dealer's hand (i.e. cards are dealt to the dealer).

In S6, the CPU 41 carries out a player's hand lottery process. Similar to dealer's hand lottery process (S5), the player's hand lottery process (S6) is to determine player's hand from a deck by a lottery.

To be more specific, the CPU 41 extracts seven numbers from the remaining forty six cards except for the seven cards selected at the dealer's hand lottery process (S5). Then the CPU 41 sets seven cards corresponding to the thusly extracted numbers as a player's hand of the terminal 4 (i.e. cards are dealt to a player).

The above-described process is carried out for all the six terminals 4. That is to say, the CPU 41 determines six sets of the player's hand. After that, the CPU 41 proceeds to S7.

After the player's hand lottery process (S6), the CPU 41 carries out a remaining card specifying process (S7). The remaining card specifying process is to specify cards other than dealer's cards and players' cards, among from cards in the deck. In detail, the CPU 41 specifies numbers and suits of the remaining cards, based on results of the dealer's hand lottery process (S5) and the player's hand lottery process (S6), and numbers associated with individual cards.

The CPU 41 stores the specified numbers and suits of the remaining cards in the RAM 42 as information on the remaining cards, and proceeds to S8.

In S8, the CPU 41 transmits information on the players' hands (e.g., information on numbers and suits like "7 of Hearts" or "Ace of Spades") determined by the lottery result at the player's hand lottery process (S6) to each terminal 4. At this point in time, players' hands related to respective terminals 4 are dealt to each player (each terminal 4).

After transmitting the information on the players' hands (hereinafter, referred to as the "player's hand information"), the CPU 41 displays an animation image of the dealer dealing out seven cards to each player in the main screen 101 (refer to FIG. 8) of the front display 21, in dealer's image effect process (S9).

At this point in time of dealing cards, the dealer's hand should be hidden so the main screen 101 only shows an image of face-up-side-down cards (similar to the back face images 88 in FIG. 6). Therefore, players cannot see numbers and kinds of suits on the dealer's cards.

Next, the CPU 41 receives information on high-hand and low-hand division of players' hands (S10). That is, in S10, the CPU 41 receives information on high-hand and low-hand division of players' hands in each terminal 4 (hereinafter, the information is referred to as "player's hand division information"), and stores information of each terminal 4 in the RAM 42.

In the card gaming machine 1 of this embodiment, a player can freely divide the player's hand into a five-card hand (high hand) and a two-card hand (low hand) at each terminal 4.

In S11, the CPU 41 carries out a dealer's hand dividing process. The dealer's hand dividing process (S11) is to divide seven dealer's cards determined at the dealer's hand lottery process (S5) into dealer's high hand and dealer's low hand. Here, the CPU 41 prosecutes to divide dealer's hand into dealer's high hand and dealer's low hand in accordance with predetermined house rules.

Upon determining the dealer's high and low hands, the CPU 41 also switches the back face images of the dealer's cards into face-up images on the main screen 101 of the front display 21 (refer to FIG. 8). Accordingly, players are now able to see numbers and suits on the dealer's cards (both high and low hands) displayed on the main screen 101 more clearly.

In S12, the CPU 41 executes a winning/losing judgment process. For the winning/losing judgment process (S12), the CPU 41 compares the dealer's high and low hands with each player's high and low hands, respectively, to determine winning/losing between a player and the dealer.

To be more specific, the CPU 41 carries out winning/losing judgment according to a hand of cards. For instance, if both of the dealer's high hand and low hands are higher than player's high hand and low hand, it is player's losing.

Meanwhile, if both of the player's high hand and low hand are higher than the dealer's high hand and low hand, the CPU judges it as the player's winning. In other cases besides these two patterns, the CPU 41 judges it as a draw.

While there are diverse kinds of hands of Pai Gow Poker, they are well known already, so explanations on them will be omitted.

In S13, the CPU 41 sends results of the winning/losing judgment process (S12) to corresponding terminals 4, respectively.

And the CPU 41 displays a notice image for notifying each terminal 4 of the winning/losing judgment result, in the main screen 101 of the front display 21 (S14).

In S15, the CPU 41 refers to the RAM 42 to decide whether a side bet flag is stored. That is, the CPU 41 judges whether there is a terminal 4 where a side bet was executed.

If a side bet flag is stored (S15: YES), the CPU 41 proceeds to S16 to give a player an opportunity to win a bonus payout. On the other hand, if a side bet flag is not stored (S15: NO), the CPU 41 ends the game processing program as is.

It is to be noted that the processing after S16 is done only in a terminal 4 where a side bet was made. In other words, a terminal 4 where no side bet has been made is not provided with a chance to win a bonus payout, but enters standby mode until the processing from S16 through S21 are completed.

In S16, the CPU 41 reads out the remaining card information from the RAM 42. As discussed earlier, the card gaming machine 1 of this embodiment has four remaining cards, and the number and suit on each one of the remaining cards is stored in the RAM 42 as the remaining card information. Therefore, by reading out the remaining card information the CPU 41 can specify numbers and suits on cards that compose the remaining card group.

Also, to execute the processing in S16, the CPU 41 sends the read-out remaining card information to a terminal 4 where a side bet was made (hereinafter, referred to as a "target terminal"). In this way, the card gaming machine 1 causes the Liquid crystal display 10 of the target terminal to display images of cards which belong to the remaining card group (refer to FIG. 12).

In S17, the CPU 41 carried out a first card group determination process.

As mentioned before, the first card group composes a part of a bonus target card group, and whether to make a bonus payout is decided depending on the bonus target card group.

In the first card group determination process (S17), the CPU 41 specifies a first card group from the remaining card group composed of four cards. To be more specific, the CPU 41 specifies two cards as the first card group, based on numbers and suits on individual cards included in the remaining card information that was read out in S16. After selecting two cards out of the remaining card group composed of four cards and setting the two cards as the first card group, the CPU 41 stores the numbers and suits on those two cards in the first card group in the RAM 42 as the "first card group information".

Next, in S18, the CPU 41 carries out a second card group determination process. Like the first card group, the second card group composes a part of the bonus target card group.

In the second card group determination process, the CPU 41 refers to the RAM 42 and specifies player's hand of the target terminal based on player' hand information the target terminal. In doing so, the CPU 41 can specify the numbers and suits of individual cards composing the player's hand in the target terminal.

And the CPU 41 chooses three cards from the player's hand in the target terminal and sets the three chosen cards as the second card group. Later, the CPU 41 stores the numbers and suits of the cards in the RAM 42 as the "second card group information".

Here, in the first card group determination process (S17) and the second card group determination process (S18), the CPU 41 prosecutes to determine the first card group and the second card group. In this regard, cards composing the first card group and cards composing the second card group each are randomly selected by lotteries.

Diverse rules or standards can be created to select the first and the second card group. For instance, It is possible to compose the first and second card groups by selecting most preferable cards (e.g., cards to compose a combination of high bonus payouts, or cards which are likely to form a winning combination) from target card groups (i.e. the remaining card group and the player's hand). In short, the first and second card groups may be made out of the most profitable cards (or best cards) to a player.

After the second card group determination process (S18), the CPU 41 sends bonus target information associated with the bonus target card group (S19). Here, the bonus target information includes numbers and suits on individual cards that compose the bonus target card group. To summarize, the CPU 41 specifies a bonus target card group based on the information on the first and second card groups being stored in the RAM 42, and transmits the bonus target information to the target terminal (S19).

After transmitting the bonus target information to the target terminal, the CPU 41 proceeds to S20.

Figure 14:
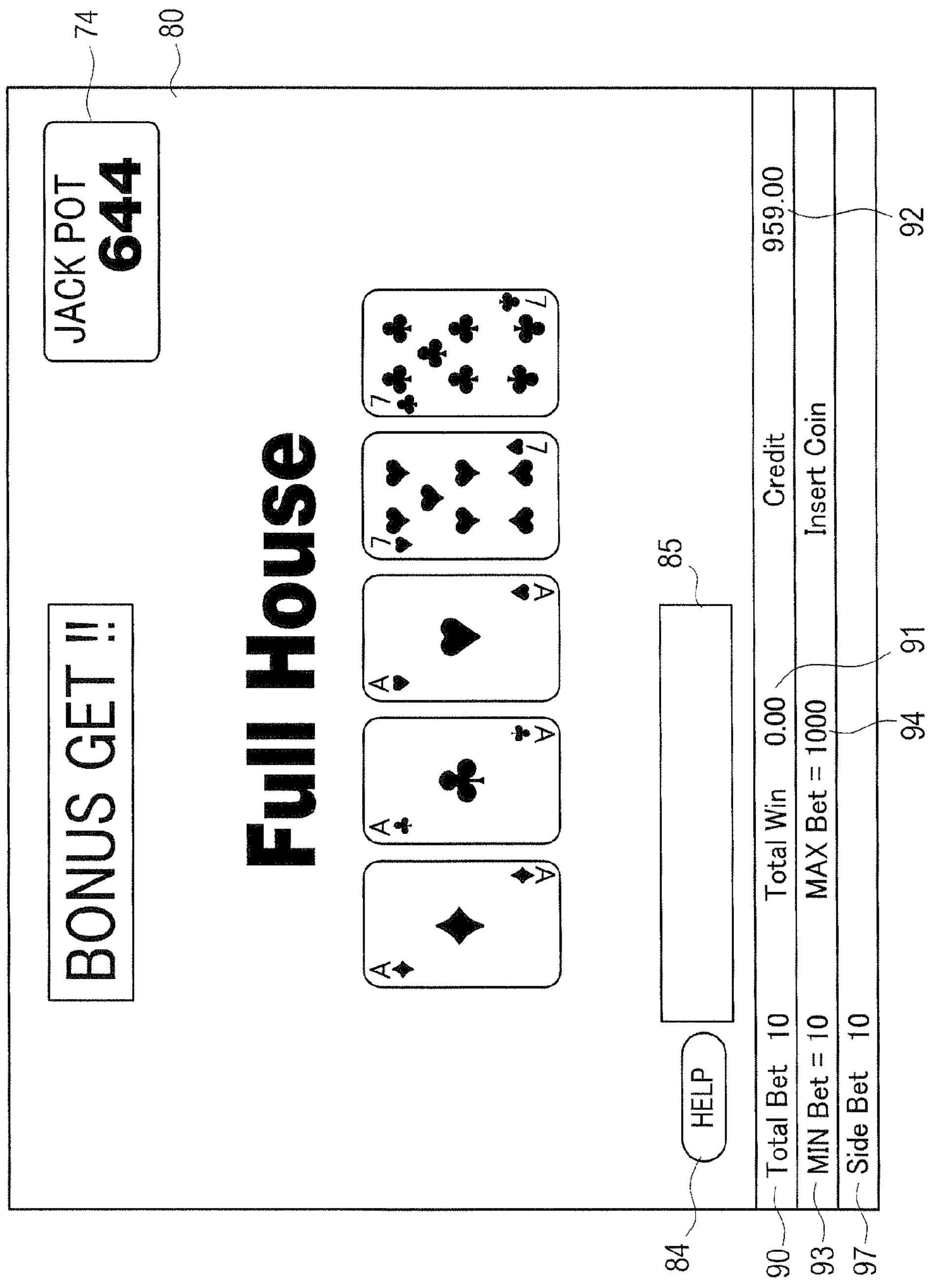
FIG. 14 is an explanatory view showing a pattern in which a liquid crystal display of a terminal displays a bonus target card group.

In S19, the CPU 41 prosecutes to send the target terminal the bonus target information (S19), whereby the liquid crystal display 10 of the target terminal shows card images of the bonus target card group (refer to FIG. 14).

After sending the bonus target information to the target terminal, the CPU 41 carries out a bonus judgment process with reference to the bonus target card group for the target terminal (S20). To be more specific, the CPU 41 acquires information on the numbers and suits of five cards that compose the bonus target card group of the target terminal from the RAM 42. And the CPU 41 judges whether a predetermined winning combination defined in a bonus payout determination table (refer to FIG. 13) is formed or not, according to numbers and suits of the bonus target card group In case the bonus target card group forms a predetermined winning combination defined in the bonus payout determination table, prize corresponding to the winning combination is determined as "bonus payout". In this regard, if the bonus target card group does not form in any combination defined in the bonus payout determination table, the CPU 41 sets the bonus payout to "0".

The bonus payout determination table will now be explained in reference to FIG. 13. As listed FIG. 13, the bonus payout determination table defines kinds of poker combinations such as "Royal Straight Flush", "Straight Flush" and so on, as well as payouts corresponding to respective winning combination.

For example, as shown in FIG. 13, "15" as a bonus payout is defined for "Two Pairs" according to the bonus payout determination table. Thus, if the bonus target card group forms the combination of "Two Pairs", "15" credits are determined as a bonus payout. Since this principle is applied equally to the other combinations as well (e.g., "Full House", "Straight", etc.), detailed description thereof will be omitted.

Meanwhile, "Jackpot" is awarded for a combination of "Royal Straight Flush".

Therefore, if the bonus target card group forms the combination of "Royal Straight Flush", a player wins the "Jackpot". In this case, "award of a pooled amount in a pot" is determined as "a bonus payout".

After judging presence/absence of bonus payout and a content of bonus payout at the bonus judgment process (S20), the CPU 41 sends the bonus judgment result to the target terminal (S21). Here, the bonus judgment result includes information on a formed combination, a content of the bonus payout (e.g., the number of credits to be awarded), and so on.

After sending the bonus judgment result to the target terminal, the CPU 41 terminates the game processing program in the main control section 31.

The bonus judgment result being sent to the target terminal, a result of the bonus judgment process is displayed in the liquid crystal display 10 of the target terminal. The result of the bonus judgment process includes the formed winning combination, the content of bonus payout and so on. Further, in the target terminal, there is carried out various amusement effects (e.g., a video image effect on the liquid crystal display 10) according to the bonus judgment result (S118).

Finally, payout of prize acquired in the game is made at the target terminal in accordance with the winning/losing result and the bonus judgment result.

A description on the game processing program executed in a terminal 4 will now be given in reference to FIGS. 9 through 11.

Referring to FIG. 9, first of all, the CPU 51 of the terminal 4 receives a command to start a betting period from the main control section 31 (S101).

Receiving the command to start a betting period, the CPU 51 also displays the game screen 70 (refer to FIGS. 6 and 7) on the liquid crystal display 10 and lets the betting period started (S102). The betting period is a period for accepting a bet and side bet made by a player. Therefore, acceptance of bet operation is started concurrently with start of the betting period. And the CPU 51 accepts bets for Pai Gow Poker and side bets based on the operation information from the touch panel 11 until termination of the betting period.

After the betting period has started, the CPU 51 determined whether the betting period has ended (S103). In detail, the CPU 51 determines whether a predetermined period of time (e.g., 20 sec) from the start of accepting betting operations (i.e. receiving the command to start the betting period) has lapsed.

If the betting period has ended (S103: YES), the CPU 51 proceeds to S104. Meanwhile, if the betting period has not ended (S103: NO), the CPU 51 continues receiving betting operations.

When the betting period is over, the CPU 51 stores current bet information in the RAM 52 and sends the bet information to the main control section 31 (S104). The bet information includes an amount of bet (the number of credits) placed by a player and information on a side bet.

Next, in S105, the CPU 51 receives a player's hand information. The player's hand information received in S105 corresponds to the information transmitted from the main control section 31 in S8. Accordingly, the player's hand information includes numbers and suits (e.g., "7 of Hearts", "Ace of Spaces", etc.) on individual cards composing a player's hand.

Upon receiving the player's hand information, the CPU 51 displays the seven player's cards on the game screen 70 (S106). In S106, the CPU 51 displays back face images 88 (refer to FIG. 6) of those seven cards on the player's hand display area 71. As shown in FIG. 6, players cannot see numbers and suits of the cards composing a player's hand. When a predetermined time (e.g., 3 sec) elapses from the display of back face images 88, the CPU 51 shows face-up images 87 (refer to FIG. 7) of the player's hand, based on numbers and suits included in the player's hand information. Now that face-up images 87 of the player's hand are shown, the player can see the numbers and suits on the cards.

In S107, the CPU 51 starts accepting division change operation on the player's hand displayed on the game screen 70. This division change operation allows a player to change classification of player's high hand and player's low hand shown on the game screen 70, through the operation of the touch panel 11.

In S108, the CPU 51 determines whether division change operation is done based on the operation information from the touch panel 11. If a player carried out the division change operation (S108: YES), the CPU 51 executes the division change process (S109). In the division change process (S109), the CPU 51 changes the player's hand division information in accordance with the division change operation and reflects such changes in the arrangement of the players' hand on the game screen 70. Here, the player's hand division information includes a classification of high hand and player's low hand in the player's hand. To be more specific, the player's hand division information includes the numbers and suits of individual cards that belong to a player's high hand and the numbers and suits on individual cards that belong to a player's low hand.

On the other hand, if a player did not carry out the division change operation (S108: NO), the CPU 51 proceeds to S110.

In S110, the CPU 51 determines whether a predetermined period of time (e.g., 15 sec) from the start of the operation accepting process (S107) has lapsed.

If a predetermined period of time has lapsed (S110: YES), the CPU 51 sends player's hand division information to the main control section 31 (S111). On the other hand, if the predetermined period of time has not lapsed (S110: NO), the CPU 51 returns the process to S108. In this manner, a player can carry out the division change operation again so as to correct division of the player's high hand and low hand.

After transmitting the player's hand division information to the main control section 31 (S111), the CPU 51 receives winning/losing judgment result from the main control section 31 (S112).

Next, the CPU 51 displays the winning/losing judgment result on the liquid crystal display 10 of the terminal 4, based on the received winning/losing judgment result (S113). In detail, the CPU 51 shows "YOU WON!", "DRAW", or "YOU LOST!" on the winning/losing display area 95 of the game screen 70 (refer to FIG. 7), according to the winning/losing judgment result.

In addition, the winning/losing result being displayed at the winning/losing judgment result display process (S113) are for a Pai Gow Poker game and does not indicate presence/absence of a bonus payout.

In S114, the CPU 51 determines whether or not a side bet is made at the terminal 4 by referring to bet information stored in the RAM 52. That is, in S114, the CPU 51 determines whether the terminal 4 is a "target terminal" mentioned earlier.

If a side bet has been made (S114: YES), the CPU 51 proceeds to S115.

However, if a side bet has not been made (S114: NO), the CPU 51 carries out a payout process (S119). In this case, the terminal 4 gets a payout according to the winning/losing judgment result of a Pai Gow Poker game.

Figure 12:
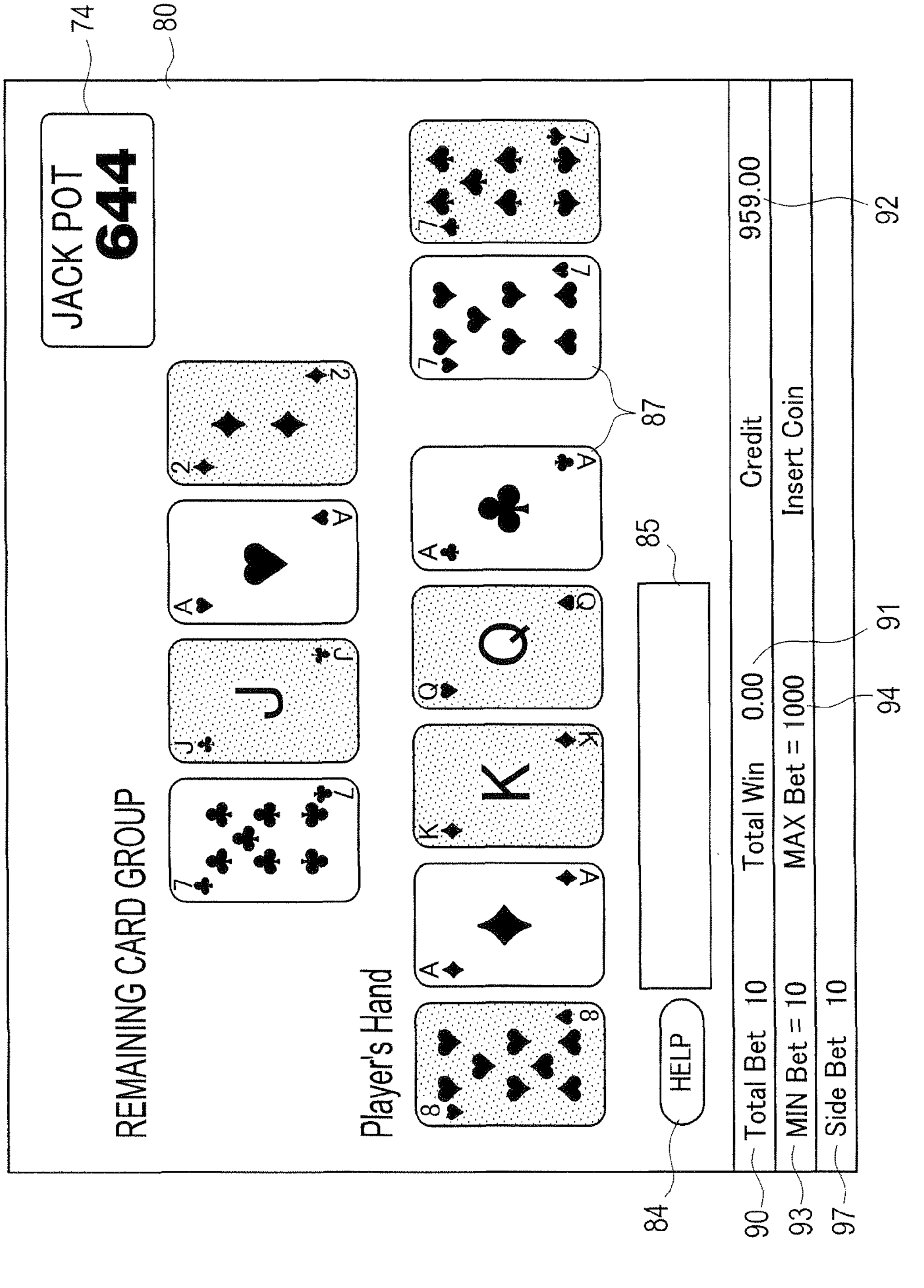
FIG. 12 is an explanatory view showing a display pattern of a bonus game screen that is displayed on a liquid crystal display of a terminal.

In S115, the CPU 51 displays a bonus game screen 80 on the liquid crystal display 10 of the terminal 4 (refer to FIG. 12). At this time, the CPU 51 receives the remaining card information that was transmitted (S16) from the main control section 31. Displaying the bonus game screen 80, the CPU 51 can specify the numbers and suits of individual cards composing the remaining card group based on the remaining card information read out from the RAM 52.

Accordingly, the CPU 51 can display face-up images 87 of the player's hand at the terminal 4 and face-up images of the remaining card group (refer to FIG. 12). Here, in the bonus game screen 80, the player's hand is displayed with being classified into the player's high hand and the player's low hand based on the player's hand division information.

In S116, the CPU 51 receives bonus target information from the main control section 31. And the CPU 51 prosecutes to display a bonus target card group on the bonus game screen 80, based on the received bonus target information, and notify the player of the bonus target card group.

To be more specific, as shown in FIG. 12, among to the face-up images of player's hand and those of remaining card group displayed in the bonus game screen 80, cards composing the bonus target card group and other cards are distinguishably indicated. In case of an example shown in FIG. 12, the CPU 51 displays the bonus target card group and other cards in different colors. In this way, a player can see which cards out of the eleven cards consisting of four cards in the remaining card group and seven cards in a player's hand belong to the bonus target card group.

Later, the CPU 51 changes a display pattern on the bonus game screen 80 from a separate form of the player's hand and the remaining card group (refer to FIG. 12) into a single pattern of only five cards composing the bonus target card group (refer to FIG. 14). As such, the bonus game screen 80 displays only the bonus target card group, which helps a player to see the composition of the bonus target card group more clearly.

In S117, the CPU 51 receives bonus judgment result from the main control section 31. Then CPU 51 displays the judgment results such as "presence/absence of a bonus payout" or "a winning combination" on the bonus game screen 80, according to the bonus judgment result (S118).

For instance, referring to an example in FIG. 14, the bonus target card group is composed of five cards, i.e. "Ace of Diamonds", "Ace of Clubs", "Ace of Hearts", "7 of Hearts", and "7 of Clubs", forming a combination of "Full House" (refer to FIG. 13). Therefore, in this case, a player is awarded "100" credits, independent of an award for Pai Gow Poker (i.e. winning/losing judgment result). In this regard, the CPU 51 displays a string of "BONUS GET!" on the winning/losing display area 95 and a string of "Full House" as a winning combination on the bonus game screen 80 (S118).

After displaying the bonus judgment result on the bonus game screen 80, the CPU 51 carries out a payout process (S119). In the payout process (S119), the CPU 51 carries out addition of credits or payout of coins based on winning/losing judgment result and the bonus judgment result. That is, in case the process shifts to the payout process (S119) from S114, the CPU 51 either adds credits or makes a coin payout based on the winning/losing judgment result only. Meanwhile, in case the process shifts to the payout process after the series of S115-S118, the CPU 51 carries out either addition of credits or payout of coins. That is, the CPU 51 awards to the player both "payout based on a winning/losing judgment result" and "payout based on bonus judgment result".

A payout based on the winning/losing judgment result corresponds to "credits twice the bet" if a player won the dealer, and "credits same as the bet" if the game was draw.

As explained above, with the card gaming machine 1 and the card game playing method according to the present invention, Pai Gow Poker is played on the condition of a bet at the game value (e.g., credits or chips). That is, in the card gaming machine 1 and the card game playing method, player's hand and dealer's hand are associated with a player and a dealer, respectively. Then the players' hand and the dealer's hand are compared to judge winning/losing hands, and payout is made based on the winning/losing result and bet amount (i.e. a payout based on the winning/losing judgment result) (S119).

According to the card gaming machine 1 and card game playing method of the present invention, if a side bet is made (S15: YES, S114: YES), the bonus target card group is specified by combining a part of a player's hand and a part of the remaining card group. For the bonus target card group, the bonus determination process (S20) to find out whether a cards composed of the bonus target card group forms a predetermined winning combination defined in the bonus payout determination table (refer to FIG. 13) is carried out and a bonus payout is awarded to a player according to the winning combination formed (S119).

Because the winning/losing judgment process (S12) and the bonus determination process (S20) are carried out as two separate ones, a player who has made a side bet has a chance to win a bonus payout, irrespective of the winning/losing judgment result. Further, the card gaming machine 1 and card game playing method of the present invention can increase expectations of players for high payouts, thereby motivating them to get more excited about a game.

A bonus target card group is made by combining a first card group and a second card group. The first card group consists of cards that are selected from the remaining card group in the first card group determination process (S17). And the second card group consists of cards that are selected from a player's hand in the second card group determination process (S18).

That is, the availability of a bonus payout and/or the contents of a bonus payout is influenced not only by the composition of a player's hand (i.e. numbers and suits on the cards in the player's hand), but also by the composition of the remaining card group. Thus, although a player who made a side bet knows his hand (e.g., at a point of time shown in FIG. 7), it is not easy for him to figure out the composition of a bonus target card group. Consequently, it becomes very difficult to predict presence/absence of bonus payout and contents of a bonus payout. In the card gaming machine 1 and card game playing method of the present invention, a player's expectation to a bonus payout and enthusiasm on the game are improved.

Also, considering the points that "a bonus payout is made irrespective of the winning/losing judgment result" and "a player cannot easily figure out the presence/absence of a bonus payout and contents of a bonus payout", the card gaming machine 1 and card game playing method according to the present invention does give players great expectation to win high payouts and improve enthusiasm on the game.

In one embodiment of the present invention, the first card group was made out of cards that are chosen from the remaining card group, and the second card group was made out of cards that are chosen from a player's high hand.

Here, the remaining card group is composed of cards taken from a deck, yet the cards do not belong to any of the dealer's hand and the players' hands. That is, the remaining card group has no influence on winning/losing in a game of Pai Gow Poker.

In this regard, since the first card group is determined by the remaining card group, the remaining card group indeed has a major influence on presence/absence of bonus payout and contents of the bonus payout. Therefore, unlike traditional Pai Gow Poker, the card gaming machine 1 and card game playing method of the present invention makes effective use of the remaining card group. In doing so, players may have higher expectation for payouts and be intrigued by a game even more.

Further, according to the card gaming machine 1 and card game playing method of the present invention, to specify a bonus target card group, a third party besides players or a machine (e.g., a game controller or a dealer) determines the second card group. That is to say, players are not involved in determining the second card group. Since players do not determine the second card group, there is no way for them to figure out a complete set of the bonus target card group. Again, this consequently helps players to enjoy a game even more, without reducing the excitement level in the game.

Needless to say, the present invention is not limited to the exemplary embodiments described hereto, and it should be understood that various changes in form and details may be made therein without departing from the spirit.

For instance, while the exemplary embodiment of the invention teaches that the dealer' hand and players' hands for every terminal 4 are always drawn from a deck of cards, the present invention is not limited thereto. That is, instead of dealing cards to all of the 6 sets all the time, cards may be dealt to only some terminals players are seated at.

In so doing, the number of cards constituting the remaining card group will increase as much as the number of cards to be dealt to players decreases. Therefore, a player now have more can-be selected cards to compose the first card group, and the thusly obtained bonus target card group may be more diverse in composition. To be short, in playing a certain game, a bonus payout schedule thereof may be diversified.

Moreover, while the exemplary embodiment of the invention chose cards from a player's hand to compose the second card group, it is also possible to choose cards from a "player's high hand" only. Likewise, cards may be chosen from a "player's low hand" only to compose the second card group. In this case, because the second card group is composed by a smaller number of cards than the player's hand, the player may feel less distressed about selecting cards for the second card group.

Further, the second card group may be composed of cards from the dealer's hand. Again, it is possible to compose the second card group with cards from the "dealer's high hand" only or the "dealer's low hand" only.

In addition, while the exemplary embodiment of the invention has fixed the number of cards composing a bonus target card group to five, the present invention is not limited thereto. That is, two or more cards are sufficient to create a variety of compositions for the bonus target card group.

Also, while the exemplary embodiment of the invention used two cards to compose the first card group and three cards to compose the second card group, the present invention is not limited thereto, but diverse compositions may be possible. For example, the first card group may be made out of a single card, while the second card group is made out of four cards.

Moreover, all of the four cards in the remaining card group may be used up to compose the first card group, and with these four cards plus one card selected from a player's hand may be used to compose a bonus target card group.

While the exemplary embodiment of the invention made the CPU 41 determined the second card group by using cards from a player's hand, the present invention is not limited thereto. That is, a player himself can operate the touch panel 11 of a target terminal and select cards to compose the second card group.

In such case, a player selects the second card group before or after the numbers and suits on cards in the player's hand are disclosed.

For instance, when a player composes the second card group before the numbers and suits on cards in the player's hand are disclosed, the player should choose cards to compose the second card group while not knowing anything about the numbers and suits on individual cards in the player's hand. Therefore, players cannot predict which cards they should choose to compose the second card group, and what numbers and suits the cards in the bonus target card group are going to have. Consequently, these help players enjoy tense excitement about the availability of a bonus payout.

On the other hand, when a player composes the second card group after the numbers and suits on cards in the player's hand are disclosed, the player may freely choose cards for the second card group while being aware of the numbers and suits on individual cards. In this case, intension of the player is reflected to a certain degree in composing the second card group. By allowing a player to select cards for the second card group after the numbers and suits on cards in the player's hand are revealed, the bonus target card group may be composed more strategically.

Even in this case, the player is not involved in the selection of cards composing the first card group, predictability for bonus payouts is still low.

Figure 15:
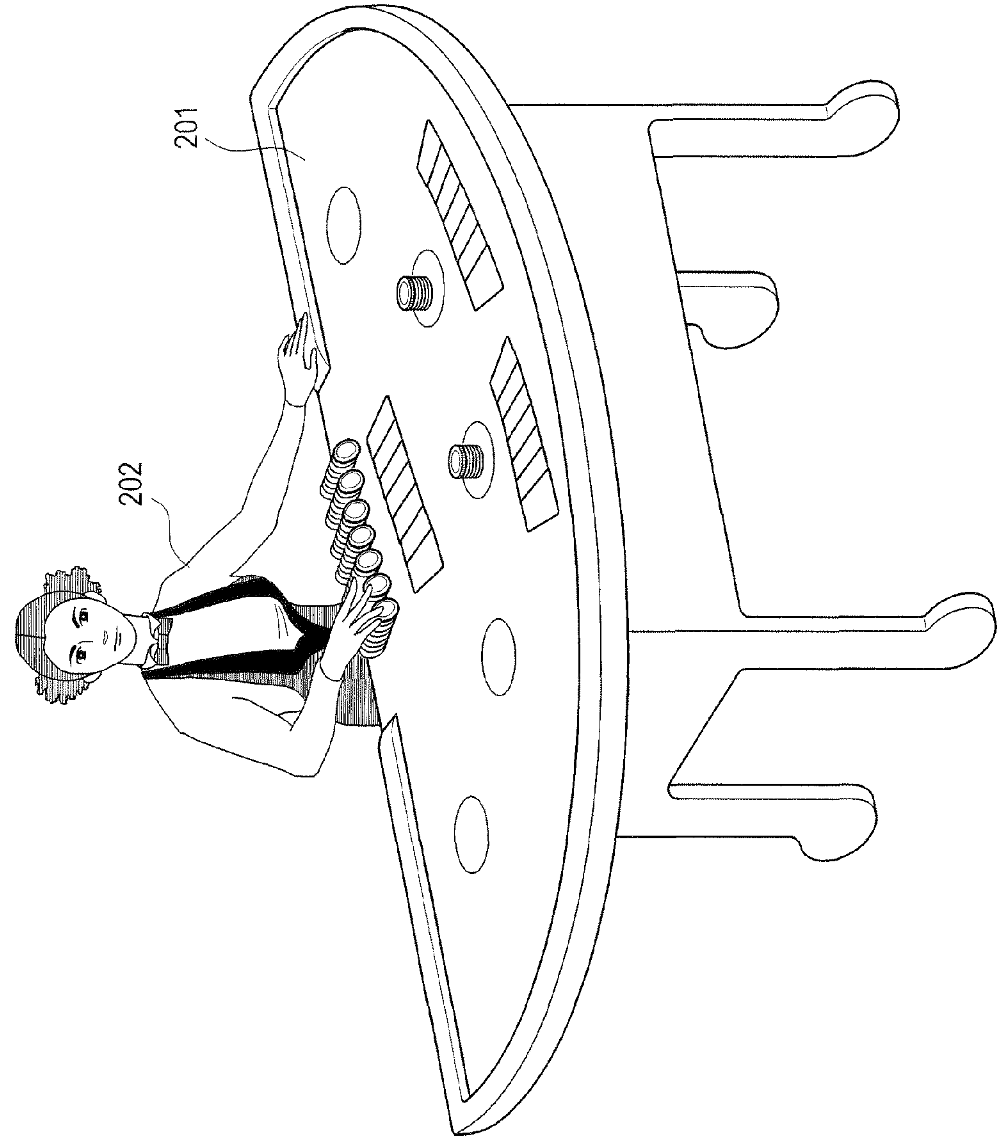
FIG. 15 diagrammatically illustrates an application of the present invention to a table game.

Also, as shown in FIG. 15, the card game playing method of the invention can be applied to Pai Gow Poker (so-called a table game) where a dealer 202 and players (not shown) play a game on a game table 201.

In playing such a table game, the dealer 202 prepares a deck of cards and deals out cards to the dealer himself and each player on the game table 201. Similar to the card gaming machine 1 of the invention, a remaining card group is specified in this way. Meanwhile, players place chips anywhere on the game table 201 to make a bet. Players can also make a side bet by applying the same method.

Further, the method used in the card gaming machine 1 of the invention can be applied in proceeding of the game of Pai Gow Poker, except that actual (not virtual) dealer and players themselves deals cards.

If a player made a side bet, the dealer selects two cards from the remaining card group. And the dealer specifies a bonus target card group with five cards by combining the two cards with three cards from a player's hand. Later, the dealer determines whether the bonus target card group formed a predetermined winning combination (i.e. a poker combination shown in FIG. 13), and awards a winner a bonus payout (chips) according to the combination formed.

In this regard, even in case of the table game shown in FIG. 15, if a player pooled some percentage of a bet in a pot and has a winning combination of "Royal Straight Flush" for the bonus target card group, the pooled amount may be paid out to the player.

Moreover, the card gaming machine and card game playing method of the present invention can be applied not only to Pai Gow Poker, but also other kinds of card games categorized as poker such as Blackjack, Draw Poker, etc.

While the invention has been shown and described with reference to certain embodiments thereof, it will be understood by those skilled in the art that various changes in form and details may be made therein without departing from the spirit and scope of the invention as defined by the appended claims.

What is claimed is:

1. A card gaming machine comprising:

a display for showing a plurality of cards from among a set of a predetermined number of cards that compose a deck;

an operating unit for receiving an input of information from a player; and a game controller executing the steps of:

(a) receiving a betting of a gaming value made by the player;

(b) making winning/losing judgment by comparing a player's hand consisting of cards associated with the player with a dealer's hand consisting of cards associated with the dealer, among a plurality of cards displayed on the display;

(c) awarding to the player a first prize that is based on a betted gaming value and a result of the winning/losing judgment;

(d) receiving a side bet of a gaming value made by the player;

(e) in a case where the side bet is made, specifying a remaining card group that consists of remaining cards with the player' hand and the dealer's hand being excluded;

(f) determining a first card group consisting of a first predetermined number of cards from among the remaining card group;

(g) determining a bonus target card group constituted by combining the first card group and a second card group that consists of a second predetermined number of cards included in the player's hand;

(h) judging whether or not the bonus target card group forms a predetermined combination; and (i) in a case where the bonus target card group forms the predetermined combination, awarding a second prize responsive to the predetermined combination.

2. The card gaming machine according to claim 1, wherein the game controller further executes the step of:

when specifying the bonus target card group, determining the second card group by selecting the second predetermined number of cards from cards constituting the player's hand.

3. A card gaming machine comprising:

a display for showing a plurality of cards from among a set of a predetermined number of cards that compose a deck;

a plurality of operating units, each of which receiving an input of information from a player; and a game controller executing the steps of:

(a) associating players' hands, each of which consisting of a predetermined number of cards, with the plurality of operating units, and associating a dealer's hand consisting of the predetermined number of cards with a dealer;

(b) receiving a betting of a gaming value made by a player;

(c) making winning/losing judgment for an operating unit at which a betting has been made, by comparing a player's hand associated with the operation unit with the dealer's hand;

(d) awarding to the player a first prize that is based on a betted gaming value and a result of the winning/losing judgment;

(e) receiving a side bet of a gaming value made at the operating unit at which the betting has been made;

(f) in a case where the side bet is made, specifying a remaining card group that consists of remaining cards with the players' hands and the dealer's hand being excluded;

(g) determining a first card group consisting of a first predetermined number of cards from among the remaining card group;

(h) determining a bonus target card group constituted by combining the first card group and a second card group that consists of a second predetermined number of cards included in the player's hand of the operating unit;

(i) judging whether or not the bonus target card group forms a predetermined combination; and (j) in a case where the bonus target card group forms the predetermined predetermined combination, awarding a second prize responsive to the predetermined combination.

4. The card gaming machine according to claim 3, wherein the game controller further executes the step of:

when specifying the bonus target card group, determining the second card group by selecting the second predetermined number of cards from cards constituting the player's hand.

5. A control method of a card gaming machine having a processor and an operating unit, comprising the steps of:

(a) receiving, via the operating unit, a betting of a gaming value made by a player;

(b) dealing, via the processor, a player's hand consisting of a plurality of cards and a dealer's hand consisting of a plurality of cards to a player and a dealer, respectively, from a deck that is composed of a set of a predetermined number of cards;

(c) making, via the processor, winning/losing judgment by comparing the player's hand and the dealer's hand;

(d) awarding, via the processor, to the player a first prize that is based on a betted gaming value and a result of the winning/losing judgment;

(e) receiving, via the operating unit, a side bet of a gaming value made by the player;

(f) in a case where the side bet is made, specifying, via the processor, a remaining card group that consists of remaining cards with the player' hand and the dealer's hand being excluded;

(g) determining, via the processor, a first card group consisting of a first predetermined number of cards from among the remaining card group;

(h) determining, via the processor, a bonus target card group constituted by combining the first card group and a second card group that consists of a second predetermined number of cards included in the player's hand;

(i) judging, via the processor, whether or not the bonus target card group forms a predetermined combination; and (j) in a case where the bonus target card group forms the predetermined combination, awarding, via the processor, a second prize responsive to the predetermined combination.

6. The control method of a card gaming machine according to claim 5, further comprising the step of:

when specifying the bonus target card group, determining, via the processor, the second card group by having the dealer select the second predetermined number of cards from cards constituting the player's hand held by the player.

7. A control method of a card gaming machine including a processor and an operating unit, comprising the steps of:

(a) receiving, via the operating unit, a betting of a gaming value made by a player;

(b) composing, via the processor, sets of a player's hand each of which consists of a plural number of cards and dealing a player who has bet a gaming value to one of the sets of a player's and dealing and a dealer to a dealer's hand which consists of the plural number of cards;

(c) making, via the processor, winning/losing judgment for the player who has bet the gaming value by comparing a player's hand dealt to the player and the dealer's hand;

(d) awarding, via the processor, a first prize that is based on a betted gaming value and a result of the winning/losing judgment;

(e) receiving, via the operating unit, a side bet of a gaming value made by the player who has made bet;

(f) in a case where the side bet is made, specifying, via the processor, a remaining card group that consists of remaining cards with the sets of a player's hand and the dealer's hand being excluded;

(g) determining, via the processor, a first card group consisting of a first predetermined number of cards from among the remaining card group;

(h) determining, via the processor, a bonus target card group constituted by combining the first card group and a second card group that consists of a second predetermined number of cards included in the player's hand held by the player;

(i) judging, via the processor, whether or not the bonus target card group forms a predetermined combination; and (j) in a case where the bonus target card group forms the predetermined combination, awarding, via the processor, a second prize responsive to the predetermined combination.

8. The control method of a card gaming machine according to claim 7, further comprising the step of:

when specifying the bonus target card group, determining, via the processor, the second card group by having the dealer select the second predetermined number of cards from cards constituting the player's hand held by the player.

* * * * *